(12) United States Patent
Mertens

(10) Patent No.: US 9,451,274 B2
(45) Date of Patent: Sep. 20, 2016

(54) APPARATUSES AND METHODS FOR HDR IMAGE ENCODING AND DECODING

(75) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 305 days.

(21) Appl. No.: 14/112,266

(22) PCT Filed: Apr. 20, 2012

(86) PCT No.: PCT/IB2012/052011
§ 371 (c)(1),
(2), (4) Date: Oct. 17, 2013

(87) PCT Pub. No.: WO2012/147018
PCT Pub. Date: Nov. 1, 2012

(65) Prior Publication Data
US 2014/0247870 A1    Sep. 4, 2014

Related U.S. Application Data

(60) Provisional application No. 61/557,461, filed on Nov. 9, 2011.

(30) Foreign Application Priority Data

Apr. 28, 2011    (EP) ..................................... 11164005

(51) Int. Cl.
*H04N 19/46*    (2014.01)
*G06T 9/00*    (2006.01)
*H04N 19/98*    (2014.01)

(52) U.S. Cl.
CPC ............. *H04N 19/46* (2014.11); *G06T 9/007* (2013.01); *H04N 19/98* (2014.11); *G06T 2207/20208* (2013.01)

(58) Field of Classification Search
CPC ............................. H04N 19/46; H04N 19/98
USPC .................................................... 375/240.08
See application file for complete search history.

(56) References Cited

U.S. PATENT DOCUMENTS 8,514,934 B2 *  8/2013  Ward ..................... G06T 5/009
                                          375/240.03

FOREIGN PATENT DOCUMENTS

| EP | 2009921 A2 | 12/2008 |
| WO | WO2010132237 A1 | 11/2010 |
| WO | WO2012147018 A2 | 11/2012 |

OTHER PUBLICATIONS

Qiu G et al., "Hierarchical Tone Mapping for High Dynamic Range image Visualization", Visual Communications and Image Processing; Jul. 12, 2005-Jul. 15, 2005; Beijing Jul. 12, 2005, XP030081051.

(Continued)

*Primary Examiner* — Jamie Atala
*Assistant Examiner* — Nguyen Truong
(74) *Attorney, Agent, or Firm* — Larry Liberchuk

(57) ABSTRACT

To allow improved high dynamic range image encoding, we describe an image encoding unit (551) arranged to encode a high dynamic range image (IM_HDR-in) comprising: a first receiver (901) for receiving a lower dynamic range (SELR); a first code mapping unit (904) arranged to encode in a first image (Im_1) all pixels of the high dynamic range image (IM_HDR-in) with luminances within the lower dynamic range (SELR); a second receiver (902) for receiving a maximal redundancy (MAXRED), which specifies to which amount luminances already encoded in the first image (Im_1) need to be redundantly encoded again; an image processing unit (903) arranged to determine, based upon the maximal redundancy (MAXRED), which pixels of the high dynamic range image (IM_HDR-in) need to be encoded in a second image (Im_2); a second code mapping unit (905) arranged to encode in the second image (Im_2) luminances of the pixels of the high dynamic range image (IM_HDR-in) which need to be encoded in the second image (Im_2); and a formatter (906) arranged to output the first and second image as a high dynamic range encoding S(Im_1, Im_2), and related realizations such as transcoders, decoders, signals, etc.

16 Claims, 9 Drawing Sheets

(56) References Cited

OTHER PUBLICATIONS

Larson G W et al., "A Visibility Matching Tone Reproduction Operation for High Dynamic Range Scenes", IEEE Transactions on Visualization and Computer Graphics, IEEE Service Center, Los Alamitos, CA, US, vol. 3, No. 4, Oct. 1, 1997, pp. 291-306, XP000730965.

Reinhard E et al., "Photographic Tone Reproduction for Digital Images", ACM Transactions on Graphics (TOG), ACM, US, vol. 21, No. 3, Jul. 1, 2002, pp. 267-276, XP007904044.

Francesco Banterle et al., "High Dynamic Range Imaging and Low Dynamic Range Expansion for Generating HDR Content", Computer Graphics Forum, vol. 28, No. 8,Dec. 1, 2009, pp. 2343-2367, XP055031838.

Larson Gregory W. et al., "Overcoming Gamut and Dynamic Range Limitations in Digital Images", Proceedings of the Color Imaging Conference: Color Science, Systems and Applications, Nov. 17, 1998, pp. 214-219, XP002487732.

Cadik M et al., "Evaluation of HDR Tone Mapping Methods Using Essential Perceptual Attributes", Computers and Graphics, Elsevier, GB, vol. 32, No. 3, Jun. 1, 2008, pp. 330-349, XP022732344.

Hojatollah Yeganeh et al., "Objective Assessment of Tone Mapping Algorithms", International Conf. on Image Processing (ICIP 2010), USA, Sep. 26, 2010, pp. 2477-2480, XP031813287.

Wang, L et al., "Rendering from Compressed High Dynamic Range Textures on Programmable Graphics Hardware", Proceedings/I3D 2007, ACM SIGGRAPH Symposium on Interactive 3D Graphics and Games, Seattle WA, Apr. 30-May 2, 2007, New York, NY, ACM, Apr. 30, 2007, pp. 17-24, XP008141082.

* cited by examiner

APPARATUSES AND METHODS FOR HDR IMAGE ENCODING AND DECODING

FIELD OF THE INVENTION

The invention relates to apparatuses and methods and resulting products like data storage products or encoded signals for improved encoding of images in particular of HDR scenes.

BACKGROUND OF THE INVENTION

Recently new developments have occurred regarding the encoding of images/video (whether of captured scenes or computer graphics), namely, it is desirable to better capture the entire range of object luminances and colors occurring in nature, which is called HDR (high dynamic range) encoding. For several reasons, at least for a number of years into the future, one may desire some form of backwards compatibility, which means that data of a so-called low dynamic range (LDR) encoding must be available, in particular in a way in which it always was. Moreover, as will be shown in this text, that may prove useful even on long term. The inventor realized that one rationale for having an LDR encoding is that, although displays of ever increasing dynamic range are emerging (high end), there is also a considerable segment of low dynamic range displays (e.g. mobile in an outside environment, projection, etc.).

Capturing and encoding of the HDR scene may seem straightforward, namely: just point a linear image sensor such as a CCD or CMOS at the HDR scene, and directly record a linear color signal including luminance information (n.b. in case there is no technical confusion, we may use luminance and color as synonyms, and speak e.g. of a bright color when actually its luminance component is high). However, the HDR imaging chain is more complex, since ultimately the HDR image data has to be rendered on a rendering device such as a television, and both the rendering and original scene are seen by a highly complex psychovisual human vision system, taking into account all kinds of image-, surround-, and even other conditions such as viewer mood, biological factors, etc.

Physically (colorimetrically), a sunny sky of an outdoors scene may have a luminance of 6000 nit, and an object in the scene 300 nit (contrast ratio CR 20:1). Only that object may "faithfully" be rendered on a standard television of say 500 nit white (if as simplistic standard of faithfulness we use exact luminance replication, although even discarding rendering device capabilities, such a luminance coding value or rendering strategy in principle by itself means nothing, since the human visual condition is also involved, i.e. inter alia the viewing surround, which may give to a particular rendered luminance various actual lightness sensations, which sensations even depend on such conditions as the color values of image pixels surrounding the rendered object, etc.). What one may actually strive for in practice as a relaxed rendering quality criterion is "realisticness" (e.g., perhaps if the sunny sky is relatively rendered on a living room television 20 times more bright than the object, whatever their actual absolute luminances rendered on the display, the picture may be considered realistic enough). Now that same scene must also be rendered realistically (i.e plausibly interpretable by the brain as a sunny outdoors scene) in a movie theatre with screen white of only 25 nit and contrast ratio/dynamic range of 200:1 (intraframe).

Things become more interesting when one captures HDR scenes with high contrast ratios like e.g. composited scenes with different sub-environments. E.g., since outdoors illumination can easily be a 100 to 1000 times brighter than indoors (say when the camera is positioned in a long dark corridor looking through a window to an outside sunny sub-environment), one may have in the same captured scene image pixels representing 4 nit indoors objects and 4000 nit outdoors objects. This contrast ratio may already be on the limit of what many image sensors are able to capture linearly (maximum well vs. noise), but it is definitely above the dynamic range of many rendering technologies (e.g. television viewing under light surround, and printing, approximately have a dynamic range of 40:1 typically). On the other hand, one may also imagine that e.g. the human brain doesn't really care so much whether a light source is (exactly) 20 times or 1000 times as bright as a reflective white object in the scene, as long as it credibly looks like a bright light source when rendered. So there seems to be a tension, or playing field, between the simple linear light mathematics of the captured scene side on the one hand (n.b., we ignore such issues as a gamma 0.45 and consider that in view of its inverse at the display side still essentially a linearly connected signal chain), and the complex non-linear nature of image reproduction for a human viewing at the rendering side. This may also form a playing field for designing the intermediate technologies such as image or video encoding technologies, image conversion like e.g. image enhancement, etc.

Apart from how to capture all possible scenes (ignoring for this text issues such as lens flare masking the record of dark regions, etc.), a good encoding of the image needs to "sufficiently" (i.e. realistically, e.g. credibly) represent all these natural or artificially generated scenes (and images can be of many types, from low contrast underwater scenes, to capturings of ice structures which require high precision, to high brightness light and laser shows in musical performance recordings, to even computer generated images of burning alien worlds, or infographics on science programs, etc.). Sufficiently means that there is at least enough detailed information of the scene objects represented to allow the realistic rendering of most of the scene (i.e., the rendered scene looks reasonably similar to the original scene, at least for important parts/objects of the scene, at least as far as rendering technology allows, according to quality criteria such as e.g. that the objects in the scene can be easily recognized, or the scene conveys a certain mood, etc.). And preferably the object information is furthermore encoded in an easily manageable structure, e.g. for image processing, or sharing between several apparatuses or applications, etc.

Moreover in particular, instead of optimally coding a HDR image by itself, there is a need for encoding a HDR image in relation to a lower quality LDR representation of the same scene (which LDR image would render as desirable, or at least acceptable, on LDR rendering devices). Note that in prior art the HDR image is actually geometrically also the same image/capturing as the LDR image, although one could envisage HDR encoding schemes encoding HDR information only on the same scene, i.e. for example a different image like a different view on the scene. The inventor realized that having available several variants of the scene encoding, such as e.g. an LDR variant, allows for an easier handling of the data at the usage side, e.g. an easier mapping to display driving values of an LDR display.

Prior art has taught some HDR encoding techniques based on a kind of scalable coding concept, in which by some prediction, the precision of a LDR encoded local texture is refined, or stated more accurately, projected to a HDR version of that texture, and then the difference of the original HDR image with the prediction is co-encoded as an enhancement picture to the degree desired. E.g., one may represent a HDR gray value of 1168 with a division (which not only normalizes to a new range, but thereby typically also reduces precision) by 8 to a value 146. This HDR value could be recreated by multiplying by 8 again, but since a value 1169 would quantize to the same base layer value 146, one would need an enhancement value equal to 1 to be able to recreate a high quality HDR signal. An example of such a technology is described in patent EP2009921 [Liu Shan et al. Mitsubishi Electric: Method for inverse tone mapping (by scaling and offset)]. In theory for these codecs, the inverse tone mapping prediction model (which is the smarter equivalent of a standard multiplier) should be sufficiently accurate to already give a reasonably precise HDR look, onto which minor corrections are applied (indeed, if one projects a range of possible values to another range by using a non-linear function, apart from precision issues, the original range values should be recoverable).

A technical problem with current HDR encodings is that in view of many application-driven needs of encoding (not just the classical image compression criterion of having a low amount of descriptive data bits versus a good visual quality of all the intricate scene object textures, but also e.g. ease of use of the encoded data in at least some of the several usage scenarios), there is a need for having encodings which do not rely on such a prediction scenario. In particular, encodings may be desirable for systems which already have available a data structure of a nature similar to, or of the kind of, two picture encodings (e.g. 3D encoding, e.g. on blu-ray or broadcast, has a left and a right picture). These pictures may be of the same structure (e.g. 1920×1080 pixels, 8 bits, etc.), or of different structure (e.g. 1920×1080 pixels 8 bits first image and 720×576 12 bits second image).

SUMMARY OF THE INVENTION

A simple and easily usable encoding of HDR images may be realized by embodiment concepts of our invention following principles related to an image encoding unit (551) arranged to encode a high dynamic range image signal (IM_HDR-in) comprising:

- a first receiver (901) for receiving a lower dynamic range (SELR);
- a first code mapping unit (904) arranged to encode in a first image (Im_1) all pixels of the high dynamic range image signal (IM_HDR-in) with luminances within the lower dynamic range (SELR);
- a second receiver (902) for receiving a maximal redundancy (MAXRED), which specifies to which amount luminances already encoded in the first image (Im_1) need to be redundantly encoded again;
- an image processing unit (903) arranged to determine, based upon the maximal redundancy (MAXRED) which pixels of the high dynamic range image signal (IM_HDR-in) need to be encoded in a second image (Im_2);
- a second code mapping unit (905) arranged to encode in a second image (Im_2) luminances of the pixels of the high dynamic range image signal (IM_HDR-in) which need to be encoded in the second image (Im_2); and
- a formatter (906) arranged to output the first and second image as a high dynamic range encoding S(Im_1, Im_2).

Although there may be some overlap of luminances which are encoded in both images determined by the maximal redundancy, a main intention is that the second code mapping unit 905 encodes in Im_2 mainly those luminances of IM_HDR_in which have not been encoded in Im_1 yet, or at least, have not been accurately encoded, e.g. because a wide range of scene capturing or original RAW HDR image luminances was represented with only few codes in Im_1. In principle, because of the nested nature of the luminance ranges, all scene objects with luminances falling within the LDR luminance range will already have been encoded. And if they have been sufficiently encoded, they need hence not be encoded in the HDR information second image anymore, i.e. there will be maximal redundancy. However, having two image data structures available does allow a very high level of versatility to a grader e.g. at a movie postproduction site. He may e.g. elect to encode dark parts of the scene in the LDR signal very coarsely (e.g. by clipping or coarse representation by only a few distinctive code values), and then elect to recode the same scene objects or areas in a much improved way in the second picture. The allocation can be for other reasons than purely information-technical storage of the underlying scene object textures, i.e. he can convey further information in the two image encodings, e.g. a different grading to be used for certain darker or brighter regions on HDR displays. Whereas a single image encoding, needing a single luma value per pixel, can only comprise a dual codification of certain scene regions by e.g. a pixel interlaced spatially subsampled method (first_grade_luma, second_grade_luma, first_grade_luma, . . . ), having available two or more picture memories to represent the scene enables even more versatile coding strategies, and corresponding uses. The maximal redundancy may also be e.g. a structure prescribing a couple of particular key luminances to be encoded in both images, e.g. for identification of the included objects.

Further embodiments, variants and alternative realizations comprising some teachings of the present invention are inter alia:

An image encoding unit as, in which the maximal redundancy (MAXRED) comprises luminance level specifications, and the image processing unit (903) is arranged to compare luminances of the high dynamic range image (IM_HDR-in) with the luminance level specifications and therefrom determine which pixels of the high dynamic range image (IM_HDR_in) need to be encoded in the second image (Im_2).

An image encoding unit, in which the first code mapping unit (904) is further arranged, preferably in coordination with a range determination unit (950), to determine the encoding of luminances of the high dynamic range image (IM_HDR_in) in the first image (Im_1) according to a quality criterion (Qcrit) of rendering quality of the data encoded in Im_1 on a reference LDR display. Several quality criteria may be used, to balance such issues as better rendering, higher efficiency encoding, easier regrading at the receiving end, etc.

Of course one may also consider what to encode or leave out, and how to encode it, of the HDR bright/dark further content based upon further quality criteria, e.g. Qcrit2, regarding the HDR content or look. E.g., when encoding for a particular technical system, one may take into account which kinds of HDR effects one can faithfully render on a particular display, and encode the second picture taking that into account.

An image encoding unit, in which the second code mapping unit (905) is further comprising a geometric optimization unit (960) arranged to apply a geometric transformation to encode the data for the second image (Im_2) in a realization of the second image (Im_2) being smaller in size and/or occurring less frequent in time than the first image (Im_1). This allows to increase compression.

An image encoding unit in which the first code mapping unit (904) and the second code mapping unit (905) are arranged to apply respective tone mappings TM1 and TM2, which are optimized according to encoding efficiency and/or visual quality of rendering.

An image encoding unit in which the first code mapping unit (904) is arranged to create the first image (Im_1) with a word length per pixel of 8 bit, and the second code mapping unit (905) is arranged to create the second image (Im_2) with a word length per pixel of 4, 5, 6, 7, 8, 9, 10, 11, 12, 13, 14, 15 or 16 bit, but preferably 8 bit. It is highly beneficial if the first (usable for LDR rendering) image structure is a classical one, such as e.g. 8-bit MPEG2, however the present inventive concepts would of course also work with other definitions for the first image structure (e.g. one may choose to encode the predominant LDR information in an 6 bit approximation, or in any 10 bit structure, whether by mere filling of the lower code values, linear stretching, using a code-value defining gamma function, etc., and any means may be used to create additional code values, such as e.g. linear interpolation, leaving some intermediate code values empty, applying computer graphics texture restoration functions, etc.).

The present embodiments may be used with many pre-existing container formats for encoding images, in particular what the memory or data links allows capacity wise, e.g. the encoded HDR data may be stored in systems which have a dual image encoding structure already prescribed, e.g. for 3D applications.

An image encoding unit in which the formatter (906) is arranged to communicate the first image (Im_1) and the second image (Im_2) over separate communication channels, such as e.g. Im_1 as a cable television signal, and Im_2 on demand over an internet connection.

An image encoding unit (1051) arranged to encode a high dynamic range image (IM_HDR-in) comprising:
  a receiver (1075) for receiving the high dynamic range image (IM_HDR-in) and a first image (Im_1_in) encoding luminances in a lower dynamic range situated within a higher dynamic range of the high dynamic range image (IM_HDR-in);
  an image processing unit (1003) arranged to determine a maximal redundancy (MAXRED), which specifies to which amount luminances already encoded in the first image (Im_1_in) need to be redundantly encoded again, and comprising a selector (1033) arranged to determine based upon the maximal redundancy (MAXRED) which pixels of the high dynamic range image (IM_HDR-in) need to be encoded in a second image (Im_2);
  a second code mapping unit (1005) arranged to encode in the second image (Im_2) luminances of the pixels of the high dynamic range image (IM_HDR_in) which need to be encoded in the second image (Im_2); and
  a formatter (906) arranged to output the first and second image as a high dynamic range encoding S(Im_1, Im_2).

An image decoding unit (651) arranged to decode a high dynamic range encoding S(Im_1, Im_2), whereby Im_2 contains data of luminances outside a range of luminances encoded in Im_1, comprising:
  a receiver (688) for obtaining a first image (Im_1) and a second image (Im_2) from the high dynamic range encoding S(Im_1, Im_2); and a color mapping unit (612) arranged apply a first inverse code mapping TMI1 respectively a second inverse code mapping TMI2 to the luminances encoded in the first image (Im_1) respectively the second image (Im_2), to obtain a decoded HDR output image (Im_d), whereby the second inverse code mapping TMI2 maps to luminances of the decoded HDR output image (Im_d) outside the range of luminances to which the first inverse code mapping TMI1 maps.

An image decoding unit (651), wherein the receiver (688) is arranged to extract information of the first inverse code mapping TMI1 or second inverse code mapping TMI2 from metadata (MET) encoded in the high dynamic range encoding S(Im_1, Im_2, MET).

An image decoding unit (651), comprising a geometrical mapping unit (611) arranged to apply a geometrical transformation to the data in Im_2 prior to performing the second inverse code mapping TMI2.

An image decoding unit (651), in which the color mapping unit (612) is further arranged to apply additional tone mappings to the luminance data encoded in the first image (Im_1) and the second image (Im_2) independently.

A method of image encoding for encoding a high dynamic range image (IM_HDR-in) comprising:
  receiving a lower dynamic range (SELR);
  encoding in a first image (Im_1) all pixels of the high dynamic range image (IM_HDR-in) with luminances within the lower dynamic range (SELR);
  receiving a maximal redundancy (MAXRED), which specifies to which amount luminances already encoded in the first image (Im_1) need to be redundantly encoded again;
  determining, based upon the maximal redundancy (MAXRED), which pixels of the high dynamic range image (IM_HDR-in) need to be encoded in a second image (Im_2);
  encoding in the second image (Im_2) luminances of the pixels of the high dynamic range image (IM_HDR-in) which need to be encoded in the second image (Im_2); and
  outputting the first and second image as a high dynamic range encoding S(Im_1, Im_2).

A method of image decoding for decoding a high dynamic range encoding S(Im_1, Im_2), whereby Im_2 contains data of luminances outside a range of luminances encoded in Im_1, comprising:
  obtaining a first image (Im_1) and a second image (Im_2) from the high dynamic range encoding S(Im_1, Im_2); and
  applying a first inverse code mapping TMI1 respectively a second inverse code mapping TMI2 to the luminances encoded in the first image (Im_1) respectively the second image (Im_2), to obtain a decoded HDR output image (Im_d), whereby the second inverse code mapping TMI2 maps to luminances of the decoded HDR output image (Im_d) outside the range of luminances to which the first inverse code mapping TMI1 maps.

An image structure encoding a high dynamic range image comprising:
  data of luminances within a preferential narrower sub-range (Sel(L_sc)_LDR) of a high dynamic range (Sel (L_sc)_HDR) being encoded in a first image (Im_1); and
  data of luminances outside the preferential narrower sub-range (Sel(L_sc)_LDR) of the high dynamic range (Sel(L_sc)_HDR) being encoded in a second image (Im_2), wherein the preferential narrower subrange (Sel(L_sc)_LDR) is preferably selected to allow good rendering of the first image (Im_1) on a reference low dynamic range display according to a quality criterion (Qcrit) of rendering quality of the data encoded in Im_1 on the reference low dynamic range display.

The preferential narrower subrange (Sel(L_sc)_LDR) may typically be what is optimally selected by a grader, e.g. when creating a DVD or BD version starting from a digital master grading, but may also be determined automatically, e.g. by a transcoder, e.g. on purely technical criteria, such as coding efficiency versus visual quality and impact. In any case it is a number that determines a range of luminances, which is then used by the further parts of the below methods realizing the encoding structures, to be e.g. written on one or more BDs or sent over a communication channel.

Data carrier comprising an image encoding as according to any of the presented variants.

Computer program product comprising code means allowing a computing unit to execute any of the described methods.

Many further variants of the below described embodiments are of course possible, and the skilled person understands that they may e.g. be realized in different apparatuses in different geometrical regions of the world, applying their partial functionality at different moments in time, or several times after each other, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
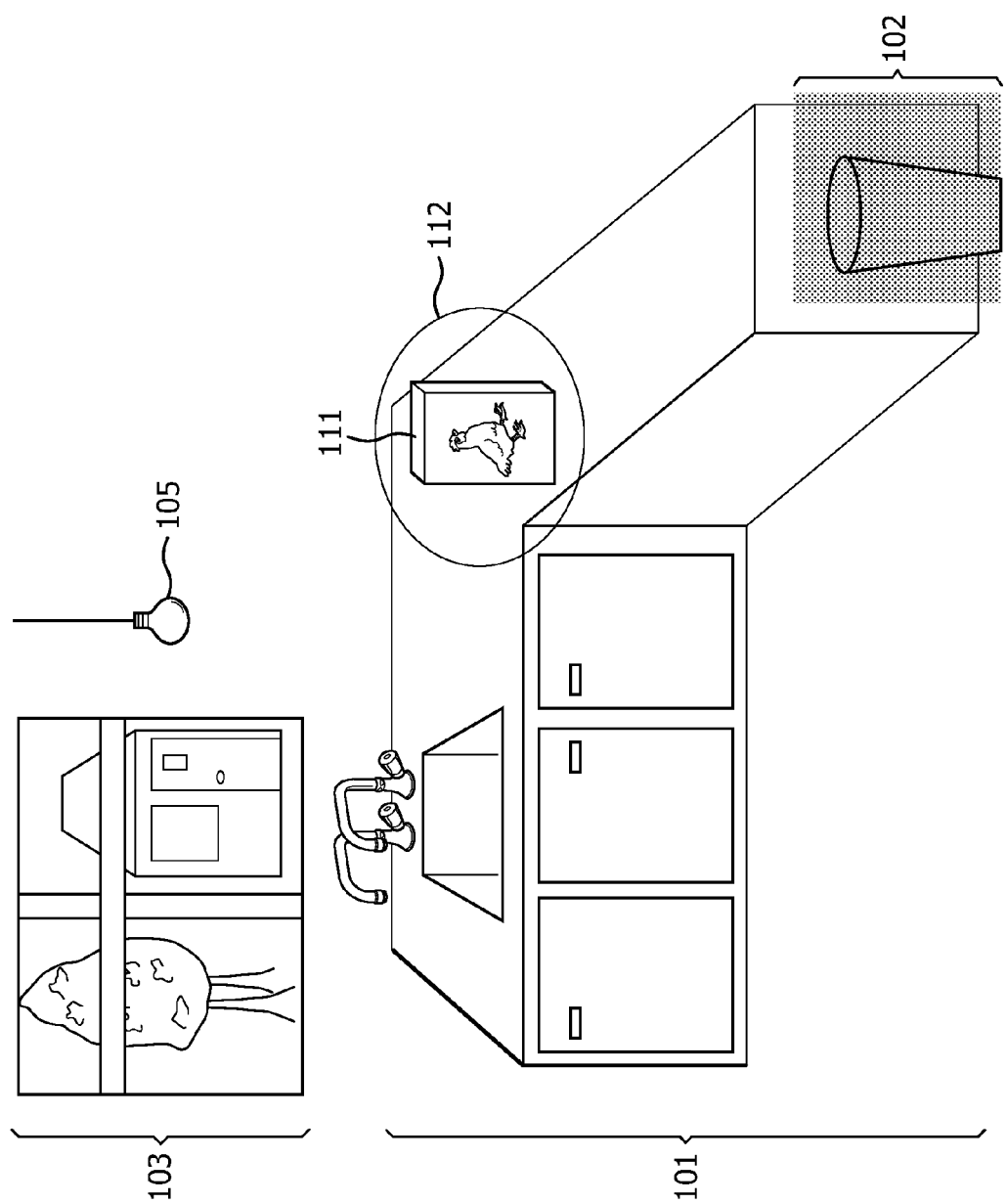
FIG. 1 schematically illustrates a scene with a high dynamic range of luminances, to elucidate some of the issues and how the below embodiments handle them.

If one looks at optical signals (i.e. the information flowing into a camera), different rules can be stated on how to measure and represent the various properties of these signals. As to temporal sampling, the law of inertia usually implies that equidistant sampling over a sufficient number of time instants should be sufficient to reasonably model a dynamically evolving system such as a moving person. Spatial sampling is of a quite different nature. The fractal nature of matter implies that one may have a use of continuously finer distributed samples (e.g., capturing a scene with mountains from afar, yields the mountains, which upon taking a closer look need intermediate pixels for the vegetation structure like leaves, upon which there are even finer structures superimposed with interesting detail, etc.). However, one still can group such scenes in "hierarchical environments". E.g. there may be persons standing on the mountain, and we may capture the environment on their scale. In that person-emphasis environment, one may still debate how much spatial detail is needed for (un)desirable representation of all the wrinkles on their faces, however, even with a moderate spatial resolution, one may already recognize that there are persons, what they are doing, what their mood is etc. (apparently, from the right capturing distance this could be faithfully done usually with a low resolution signal like PAL). In any case, there seems to be a trend towards 4K and even 8K resolutions.

A similar paradigm of equidistant sampling yielding a set of possible values was applied (as a mathematical description of a two-dimensional function doesn't treat the x-axis of a function any differently from the y-axis) to the captured luminance (or color) values: they would normally fall somewhere within a range (e.g. the EV 16 value being representative for white objects in full sun). However, one may in principle make the range whatever large by defining whatever needed maximum value. From that maximum value (which is normally interpreted as "white") one would only need to represent the lower values—linearly or non-linearly—with a pre-desired precision (which will also determine a black level of everything below the lowest code 0).

This paradigm is all-prevalent. It is how cameras work (be it that they define a pragmatic maximal white level from their sensor capabilities), it is how light and color spaces are defined (e.g. RGB space of a television is defined from a certain white downwards), and it is also how SNR-scalable encoding is constructed. The latter states that it is usually already reasonably sufficient if one approximates the luminance values of the pixels, and in case the information is still considered insufficient (e.g. because of artefacts like banding occur), one may fine-tune some of the values to higher precision, which one may do by adding bits encoding fractions of the quantized levels (i.e. one encodes a microtexture images).

However, one already sees one new issue appearing with HDR scenes: what is the white reference? In classical LDR imaging, one easily sets this one, e.g. one illuminates a television studio with light with a light-dark modulation around 8:1 and one uses white objects with a reflection of 90%, which results in a nice distribution of all pixel colors/luminances of the studio objects. However, in HDR imaging, there may be a first white which is a relevant white such as the white in the studio, a second white of the sub-environment outside as seen through the window, and possible even (much) brighter objects. Choosing the brightest white is unpractical (in particular, if one has limited word lengths like 8 bit for the luminances, or limited rendering capabilities, then many of the relevant objects will be badly rendered). However, choosing an intermediate level white is also difficult, since two questions arise, namely, where to choose that white level, and what would be the impact of unreproducible higher luminance object luminances. That didn't seem to be a problem in well-conditioned LDR scenes, which were always constructed to be of a similar nature by using well-contemplated illumination, but would pose a case dependent problem on many of the HDR scenes occurring in nature.

However, there seems to be another nice property of coding scene colors, which is somewhat similar to the spatial hierarchical environments mentioned above (just as that one doesn't need to see everything about the mountain or facial imperfections if one is imaging the actions of people on the mountain), namely, one may define "representation focus subranges" in the color/luminance value direction (n.b.: contrasting with spatial structure, the total lightness range of environments is usually much smaller, but it is still large compared to current imaging technologies, so smart handling is desired). In principle, so reformulated, this is what one has to do when one (auto)-exposes a camera and derives a (digital) signal therefrom, but those systems didn't elegantly handle the then occurring problems.

Figure 2:
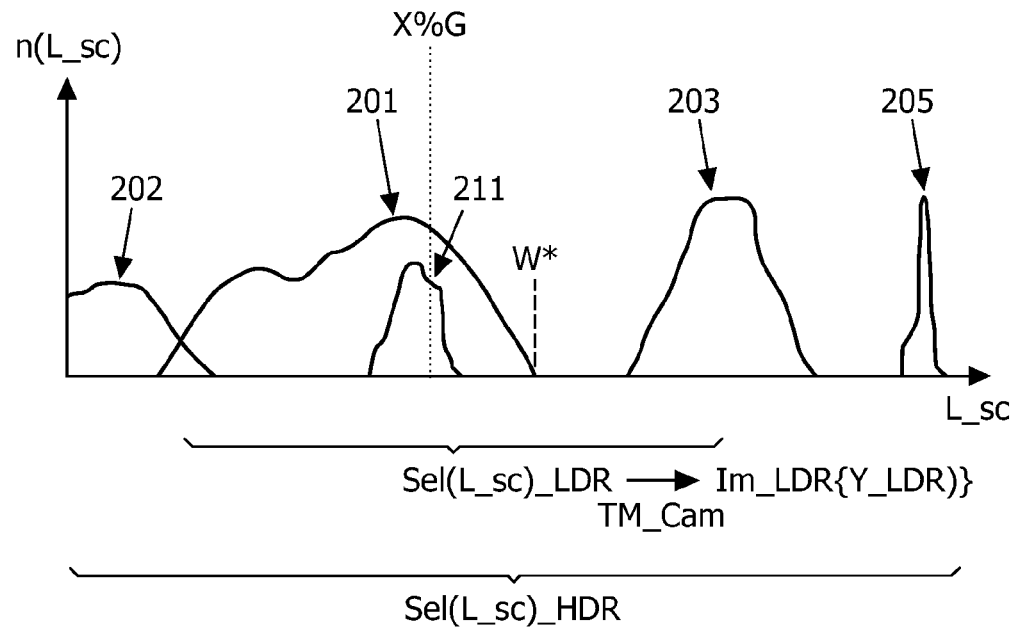
FIG. 2 schematically illustrates the histograms of luminances in that scene.

We illustrate the concept further with the exemplary HDR scene of FIG. 1, in which a kitchen environment is shown for a commercial of a food product. Apparently, there is a main spatial region corresponding to "preferred" pixel luminances (region 101), which spans most of the objects in the kitchen. This would make it an interesting subrange of luminances to focus a representation on. In FIG. 2 which schematically (i.a. the counts/heights of all regions are normalized to a similar height) shows the histogram of counts n(L_sc) for pixel luminances L_sc of the subregions of FIG. 1, this corresponds to main lobe 201 which may typically have intermediate luminances (n.b., since there is no confusion we may interchangingly talk about image pixel luminances versus luminances from points of objects in the scenes. Digitally represented image pixel luminances will be denoted with a capital Y). In HDR scenes, e.g. due to lighting with a few practicals only, there may also be dark regions (102, 202) which are darker than the darkest pixels of the main lobe 201, and often darker than what is (at least faithfully) representable in a particular image encoding (i.e. these pixels may typically have very noisy color values due to camera limitations, and may fall only on a few of the lowest luminance codes, e.g. 0, 1 and 2). The example region is shadow region 102 corresponding to dark lobe 202. However, that region is normally not of too much interest, i.e. there are no important objects there which need to be rendered clearly visible or with high quality. There may also be regions of higher luminance, such as the region outside through the window (high luminance region 103, corresponding to bright lobe 203). Such high luminance regions are different in character from the low luminance regions. Firstly in that, although it may also not contain any of the objects of specific interest, it may still be desirable to render it as realistically as possible. Secondly, these higher brightness regions are exactly the regions where brighter displays could make a difference in rendering (compared to displays of 500 nit, a 5000 nit can show the sun and the light in a picture as switched on, rather than dull, as if it were painted object colors). HDR displays may also render darker colors, but in some brighter viewing environments that may not be the first focus of realistic rendering, as they may not differ much from LDR displays in those scenarios (although they do under new dark cinematic viewing conditions, e.g. when such a screen is put in a small movie theatre or a similar environment). Finally, there can be very bright regions like a light source 105 (light lobe 205), which luminance need not be accurately coded or represented. It is desirable that this light is rendered brightly though, and preferably more bright than all the other image objects (so preferably it is also encoded with a higher luminance value, although that is not strictly necessary, as long as the receiving side knows how to interpret the light source pixels as light source pixels different from other image regions, and how to handle them, e.g. ultimately render them). Note that these histograms are in principle conceptual. They may be extracted in several ways, e.g. morphological operations may be involved. E.g., in the part of the scene outside the window, although most pixels are very bright, there may be some pixels of somewhat lower luminance, possibly even lower than some pixels in the darker (e.g. main) region(s). Then the histogram lobe can be constructed by e.g. doing a thresholding yielding in binary representation mainly a white region with small isolated black islands, and then replacing those islands with the white value (i.e. adding them to the bright regions with partially local operations rather than purely global histogram operations).

So we see that in this image there is, as in all images, a region of objects which is of higher interest, and a region(s) of objects which is of lesser interest. However, depending on imaging system capabilities (coding or processing complexity, available memory, rendering quality, server-client business model, etc.), one may want to represent as desired for the particular technology or application all these regions more or less realistically. There are normally also further technical rationales behind the preferred luminances of region 101. In this example, it is the region around the object 111 (object lobe 211) about which the commercial is made. In photographic composition, the role of the "dominant object" is well known. In video or movie making, typically this object will be lighted in a preferred way (by light spot 112), and the same will generally apply to its surroundings. I.e. the director of photography (DOP) or a similar creative function will have specifically selected in a scene what is of interest, and can indicate it (even with on-the-fly camera work, the mere actions of the cameraman determine the regions of interest). Furthermore, what one ultimately desires is that this object 111 and region 101 are optimally rendered, i.e. they are e.g. mapped to a lighter half of the luminances renderable on a particular display such as a television. In this way the product stands out, attention grabbing, and beautiful.

Actually, in classical imaging systems one has tightly coupled these two conditions (lighting+capturing versus rendering), a condition which need not necessarily be strictly retained in a newly designed HDR imaging chain (allowing more versatility, e.g. for on-the-fly reporting from the field). Currently, the camera operator already works in a color space (e.g. RGB or the related YCrCb of MPEG2 or MPEG4-10) which is tightly coupled to a final rendering television (display) color space, and he or another creative person may typically also look at his signal on a reference image monitor at the camera side, study it with a reference television color space signal monitor etc. That means that the camera man (or DOP etc.) only needs to make sure that the object 111 is lighted to be captured e.g. one stop above 18% gray, and hence it will be rendered so approximately on a viewer/receiver side display. Although some non-linear curves like a television camera gamma curve may be involved, one should understand that this is ultimately a tight, relatively inflexible linear one-to-one relationship between two color spaces (scene color space, and rendering color space). Even those technologies that aim at recalibration, normally do so with a single transformation which confirms the tight relationship (e.g. a color matrix mapping which maximally conforms the color particulars of an LCD to a standard reference CRT with EBU phosphor primaries).

Although one wants to keep the good properties of this simple system (be it already for compatibility with present practice), a technology is desirable which relaxes somewhat this strict condition, at least for scenarios for which it functions less satisfactorily, i.e. HDR imaging.

So, what one can say generically about HDR scenes is that they normally contain a main region 101 of main luminances (main lobe 201). This most important image region should in this era of many different display types be the region which is best representable on many displays (from high quality HDR, over standard LDR 8-bit television, to low quality (SubLDR) mobile displays in the sun). Image objects can be rendered with different quality under different rendering situations, but that is not so trivial that this can be done with good quality (realistically) in any whatever blind way (e.g. by a display system having to do video analysis). One can do it in better ways, or in ways which make the image look ugly under various important rendering scenarios, e.g. the HDR image may look cartoonish on an LDR display.

The main region/luminance range is what the cameraman will focus on in classical LDR imaging, so it makes sense to keep focusing on it in the rest of the imaging chain, and treat it special in any HDR imaging process/chain also. We will first explain shortly in an analyzing and paraphrasing way what is done to handle this main region in classical imaging (in which case it may be (nearly) the whole encoded image). The lighting crew will typically light the kitchen scene so that the histogram main lobe 201 doesn't have too large a dynamic range (the maximum luminance divided by the minimum luminance within lobe 201). Especially if the final output is a medium of low dynamic range, such as low quality printing, it may be beneficial to take this into account early on. Also when capturing real scenes, most normally lighted rooms won't have too much variation of object pixel luminance within the scene for high end current television scenarios. This is not true for scenes with dual luminance subranges, like e.g. from inside a car though, in which case a critical choice needs to be made. Reflection percentages of natural objects range between 0.5% and 99%, but in practice 4-90% are a more realistic values (even sometimes fake white clothing was worn on television shows). I.e. for perfectly uniform illumination, the image contrast ratio equals about 25:1. This is also what a normal television system should be able to render (of course if you don't have the sun reflecting on your face plate). Typically light modulation over the relevant parts of the scene should be below 10:1 (e.g. faces may be lit with a 2:1 modulation of the key-lighted and fill-lighted parts). I.e., 255 code values should seem rather satisfactory to code that part of the scene, even if the coding is linear (i.e. a linear mapping between scene luminance and [0,255] image code values).

To understand the mathematics better we recapture the possibilities by presenting some possible linear mappings:

A) Starting from Black Upwards:

This way of defining a linear luminance coding would seem natural, as it closely follows specifying a measurement scale from the definition of a unity step (it can be compared to the Celsius thermometer which apparently doesn't need to be able to measure temperatures above 100 degrees). One may define the "theoretical" boundaries of this linear scene luminance zone as e.g. maximum white reflectance (90%) times maximum (possible) illumination equaling 10 (arbitrary units), yielding a value of Lw=900, whereas the minimum value may be represented as an analog number 4%*1 (1 being the minimum illumination for a 10:1 modulation) or 4 (in practice, the full well capacity of a e.g. CCD pixel and a minimum level e.g. taking into consideration the noise may be used for these boundaries mutatis mutandis). So these are the boundaries of what one should be able to encode (with reasonable precision). There are some interesting issues around the code value zero, but one may map the analog supposedly blackest possible black (Lbk=4) to a digital output value $Y\_out\_lin$ of 0+db wherein db is a black offset. It makes sense to simply take db=1. Then the double luminance 8 maps to the double digital value 2, and a general scene luminance $L\_sc$ maps with the formula $Y\_out\_lin=Q[scale*(L\_sc/Lbk)]$ in which scale=1, Lbk=4 and Q is a quantization or rounding operator, e.g. to the nearest integer value.

This mapping has the property that there is a minimal rejection of (relevant) dark regions. Of course there may be darker regions in the scene than the theoretical minimum 4, but they will be mapped to 1 or 0 by the Q operator. Oftentimes they may be ill-captured by the camera or badly renderable by the display (or print etc.) anyway. There are also still a couple of $Y\_out\_lin$ values left on an e.g. 8-bit range for possible coding above the mapping of the theoretical maximum of 900 (9004 being smaller than 255), however, all really bright values of the scene will given this contrast scale factor generally be clipped or at least strongly soft-clipped near the value of 255 (but that need not be a problem if we consider that code sufficient to identify "really bright" regions).

Another property of this mapping is that the scale for this coding (making black level 1) now gives pixel luminance difference steps per code value change equal to the minimum black Lbk, which was determined by putting the maximum luminance approximately equal to white ($Y\_out\_lin=255$). More precisely, starting from black, a linear code with scale=1 will define the maximum amount of bits required to encode everything up to a desired maximum white level. If one fixes the word length to 8 bit, this works if the total contrast in the scene is less than 255:1, which is true for 900:4, otherwise the scale factor has to be adjusted, which can most easily be done by changing the black (i.e. losing precision along the entire range, corresponding to clipping below a new black). This is the natural linear contrast range of the code. Such an approach may have the problem that some regions get underrepresented, whereas near the brighter regions such small steps are not required, although one may attempt to solve this with a non-linear tone mapping curve which redistributes codes along the range, wherever they're needed (e.g. a gamma function, or sigmoidal function, etc.).

But one may also leave the black level fixed, in case one emphasizes on accurately coding darker luminances. In fact, either there is a scaled digital step (precision) starting from black (to distribute the analog values over the available [1,255], determining a $D\_L\_sc$ corresponding to a digital unit change: in the above example $D\_L\_sc=4$), or, one specifies an analog luminance step (see below, white scenario), e.g. $D\_L\_sc=3$ for a unit change and then ends up with a certain black starting from white downwards. The latter white-fixed strategy is usually more interesting, so a preferred approach, since people like to see images bright, i.e. most information is in the well-lighted regions, and the black is not very visible anyway, so coding errors in those lower regions are better tolerated. As a guidance for step sizes, one may either base them on theoretical JNDs, take a pragmatic much larger value considering that most of the time in complex varying image data the steps are less visible anyway (at least not as clear as when carefully studying a simple gradient image), or take whatever practical step value and go with whatever (sufficient or not) visual quality results. If the scene is simple like in LDR imaging, one may indeed start from a reasonable white (e.g. somewhat above reflective white, to allow at least for some highlight encoding), and then see where one happens to end up with the darker codes, which is usually more than far enough. However with HDR imaging, there may be very important information also in these darker areas, which needs to be well-encoded, since it may have to be rendered at least on some systems (perhaps after a color transformation brightening these regions to be able to render them with good dark texture discrimination in a given viewing environment).

This one may summarize by stating that the (e.g. 8 bit) system is determined by a white and a black, or differently a white and a scale. When defined by white and black, one may see the black as an offset, and then distribute 255 values equidistantly over [1,255].

Then the relationship between the scene luminances and linear codes is the following (what is required to be coded from the scene, still using the simple direct linear model):

$$L\_sc=Lbk+(Y\_out\_lin-1)*(Lw-Lbk)/254, \text{ or}$$

$$Y\_out\_lin=254*(L\_sc-Lbk)(Lw-Lbk)+1$$

So in this view there are a couple of things one may do:
1) Define a minimal black and a scale (e.g. the same value as a black of the scene or less, e.g. 2% of that black) and then find a maximum amount of required bits or word length to code up to the required white level (in this case using a black-based unit step). If however one fixes the word length, that may lead to a clipping of whites above a maximal encodable level which is too low to be desirable (i.e. too many high brightness regions are badly encoded, which one may typically see if e.g. the outdoors region is entirely clipped to white, which in some low quality cases may be half the image, and that doesn't render really well on a HDR display). This may be called "precision priority". Usually one will sacrifice black instead, as seen in the white scenario below. In any case this scenario is what often happens in LDR imaging: one wants to have good precision around the average grey level and faces, and then (by fixing the coding on such a subrange, which also depends on the chosen optimal or non-optimal illumination, e.g. one may especially in HDR scenarios use a criterion which still has enough code values in a face in a darker, badly illuminated region) one clips below a certain black and above a certain white (totally ignoring those luminances by not allocating code values to them).
2) Define a minimal black and a white. This "range priority" scenario is more sensible especially for critical HDR scenes which really have important objects all along that luminance range (e.g. a bright sun-illuminated stain glass window versus a dark corner of a church interior), since one can at least code all desired values without external clipping. However, the precision may suffer considerably, and this may be problematic when rendering scenes with a considerable original dynamic range. E.g., such coded images may look cartoonish, or have other quality artefacts.

Of course one may also fix white, black and precision, but then the required amount of bits will be a variable dependent on these, which is not so handy, since in many applications one would like to fix the word length (even if one may select from a couple of word lengths like 8, 10 or 12 bit), e.g. when a fixed amount of memory is allocated, like in a standardized television signal definition. Note that even with more precision, an image coded with the wrong contrast may still look cartoonish.

Another conclusion which can be drawn is that starting from black is not the most useful way to define a mapping, so we will as usual reconsider the above starting from white (yielding the same mathematical conclusions though).

Note that in practical 8 bit encodings one also reserves some codes on either side for other reasons like overflow during processing, but that offsetted rescaling may be currently ignored, as the mathematical behavior is in principle similar to the here explained.

An interesting question is still what visual effects these linear steps for a given scale/precision will have when rendered. In particular, they may be shown not just on a e.g. 100 nit display (which may or may not correspond to the actually measured scene luminance for the luminance 900 points, but for which 255 steps may result in relatively undetectable visual differences), but also this encoded signal may be directly applied to e.g. a 500 nit or 5000 nit display, in which case the rendered steps are further apart (because they're weighed with the display white), hence more noticeable (e.g. as banding in gradients), often in darker regions (depending also on the surround illumination).

To partially alleviate this, actual encodings use a gamma 0.45 or similar non-linear mapping, largely conforming to the JND sensitivity of the human visual system to obtain the Y values, and this mapping is inversed to obtain the display output luminances (a CRT did this by virtue of the physics of its electron gun and other factors).

One may still ignore that intermediate non-linearity since one may interpret such an imaging chain as similarly behaving coarsely mathematically like the above simplifiedly explained linear mapping (one could envisage the codes as just differently reallocated in the above range, which one could just interpret as a different preferred grading of the actual image on the available coding scale; or in other words, one can see such simple continuous functional transformations as a spring of variable stiffness, but still it needs to e.g. push the blacks somewhere, if one holds it fixed at the whites).

It is true that using a non-linearity (and in particular one which tries to minimize just noticeable difference effects) allows to encode a greater range Lw−Lbk by assigning the codes in a different way. E.g. one may assign more sparsely the codes to the lighter range, which allows to encode up to a higher white Lw*.

E.g., if the code encodes a square root of L_sc, then may define the function e.g. as:

$$L\_sc=Lbk+alpha*(Y\_out\_lin-1)*(Y\_out\_lin-1), \text{ and}$$

$$Lw=Lbk+alpha*254*254$$

If one takes the same luminance step between the black of Y_out_lin=1 and the next grey (luma code value Y=2) as in the linear case for Lw=900 and Lbk=4, namely 896254, then the above encoding formula can go up to a white of Lw=227588. More practically this means one usually will change the alpha scale, and allocate smaller steps to the darker regions (or just start from white and see at whatever black one ends up given the mapping function, as below in the fixed white scenario). One may also use this mathematics to see which additional bright region luminance range gain one can have, when one e.g. adds 2 bits (10 bit luma code) to an 8 bit code codifying an Lw with value 255.

Anyway, such an encoding strategy still has to make the decision between precision and range. Namely, small steps at one side of the luminance range come at a price of larger steps at the other side (normally the white), and they do this in a rather fixed gamma-transformation-defined way (which is a spring having a particular stiffness distribution not necessarily conforming to what one may optimally want when encoding a particular scene). So if one does want to encode the bright lights up to say 5000 nit in the scene, one risks with e.g. an 8-bit or 7-bit code losing too much precision, i.e. at least somewhere in the range there may be errors which are considered problematic (although for other scenes it may be acceptable). And, this banding may become more extreme if further processing is done somewhere in the chain, e.g. (local) adjustment of brightness or contrast in say a television. Moreover, a content creator may want to encode his (original or copy) signal more faithfully than trying to cram it into say an 8 bit word with some optimal or non-optimal non-linear mapping.

B) Starting from White Downwards:

One may also start from the allocation of "white", i.e. map 900 to 255 (or at least some high value). This is the usual way in which the display-oriented codings are seen. Then one may determine a difference D_L_sc=e.g. 3 (or multiplicative factor 3900 percentage of the maximum (white)), and keep subtracting this until one ends up with a certain black at code 1 and below. Of course, the difference is preferably chosen smartly again by taking into account the lobe 201 contrast ratio, i.e. the occurring black level.

Again, if one fixes the number of code bits, the scale fixes which blacks are still codeable, or alternatively the black fixes the precision, and that is true for non-linear functions similarly as in the linear case, only distributed around the total codeable range differently according to the chosen function. So there may be considerable freedom to allocate code values to occurring scene luminances (provided one doesn't e.g. choose the wrong gamma, as a content creator e.g., or fixed in some image communication standard), yet a limited continuous functional allocation (such as with a gamma defining the encoding, like the 2.2 gamma) still does not optimally encode a scene, in particular a highly complex HDR scene (i.e. with textures with many reflection values in several highly differently illuminated regions)

It is important to note that DOPs could choose to make or find scenes which have considerably dark blacks in them, hence lobe 201 contrast ratios well above 255:1, e.g. in film noir shooting (even given the same white level). Note that for simplicity we have focused currently solely on the camera side above (or encoding therefrom), but as we will see below the same mapping issues occur again at the rendering side, i.e. even this 255:1 setting may be challenging for some renderers.

However, then if say the contrast ratio is 1000:1, and the mapping allocates the bits with a 4 times coarser scaling (scale=4), one risks to have only a few digital codes describing the object of interest 111. I.e. one needs a trade-off between such considerations.

How exactly the mapping of scene luminances throughout the imaging chain is handled depends on the imaging system used, the kind of imaging (photography, television production, movie making, . . . ), etc.

However, typically one may do the following. The camera IC itself may handle 1000:1 or more linear scene luminance ratios, e.g. if it has a 12 or 14 bit sensor (normally one should also incorporate in that number a level where the noise becomes objectionable). With the (auto)exposure setting of the camera (aperture, and shutter time for stills), one may select, by shifting, a dominant scene luminance range Sel (L_sc)_LDR, which conventionally forms the starting point for deriving an LDR (8 bit) encoding (e.g. by mapping the linear camera signal with a sigmoidal mapping). Note that one may already create high dynamic range signals by only varying the exposure of the camera, but then they will have a high temporal dynamic range (i.e. that is for rendering purposes, but for encoding purposes each of those images may have a lower dynamic range if one were to optimally encode them, yet one may elect to encode them at variable positions along a larger common range), but the really intra-scene/intra-picture dynamic range imaging is currently done e.g. by camera which (near-)simultaneously expose with a shorter and longer exposure time, or have an interlaced matrix of camera pixels of different sensitivity, or different co-imaging subsensors, etc. Now for ideal representation of the scene objects, this dominant information containing range Sel will typically cover (i.e. encode, be it possibly with limited precision) most or all of the main lobe 201 (apart for maybe the darkest parts if full coverage is unachievable; and not further dark lobes like 202), but typically also more, e.g. a part of the high lobe 203 (though this may be almost clipped to white, be it only because of the pointed shape of RGB-like gamuts near white). Note that this range Sel is drawn symbolically, since also e.g. lobe 205 will actually be captured of course (its light does fall on sensor pixels yielding an output signal, be it a distorted one compared to reality), but as an erroneous clip to the maximal value 255. I.e. Sel roughly indicates the luminances within the range are relatively faithfully captured by the image sensor (linearly by the sensor, and pseudolinearly by the image code).

Now typically the camera or camera operator will apply (as tone mapping TM_Cam) a non-linear camera curve (automatic usually in still cameras, with limited selection in professional video cameras) to map this higher bit range (e.g. 14 bit linear) to an 8 bit signal, obtaining an LDR image Im_LDR with pixel luminances Y_LDR. This is all that the classical LDR imaging does. E.g. typically a sigmoidal curve may be applied (or an approximate sigmoidal in case of black clip), in which the inner regions may be somewhat contrast stretched (but anyhow sampled by relatively many values), and the outer regions are soft-clipped by the horizontally sloping parts of the sigmoidal curve (i.e. there is still some information on the different levels of black/white, but they are all bunched together into something which on LDR displays will look like (almost) the same pastel whitish color). As said above, for dark regions this may be less of an issue, but seeing a pastel picture of the outside of a scene through a window is not always desirable.

The selection of the shifted position of the range Sel is usually determined by some procedure similar to focusing on an x % gray level x % G. E.g. according to the grey world model, the average luminance of a scene should be approximately 18% gray (and similarly the very important human skin is 36% grey). Fixing any of those gray levels is similar to shifting compared to a determined 100% scene white W*, normally a reflective white in the well-illuminated region. In practice, a photographer may also look at a preferred object, decide it should be captured/encoded/rendered 1 stop above 18% grey, and apply the same process with an exposure value correction. Lastly in some occasions he may (usually slightly) correct that procedure by looking at more regions, like e.g. the capturing of darker regions (e.g. according to the Zone theory philosophy), in particular by looking at texture in specific critical areas (e.g. clouds). Looking at what happens with textures, in particular texture reduction due to a lesser amount of codes is an important way to come to good quality images. A related one is looking at local contrasts, e.g. one may determine at least a local brightness level e.g. by looking at how dark structures in clouds appear (e.g. under reference rendering of a captured image). This is also where sensor range may be a limited factor requiring inconvenient optimization (too dark faces, or badly captured clouds), and in particular the conventional LDR chain may be limiting.

Nowadays cameras emerge which can capture far more luminance values (Sel(L_sc)_HDR), e.g. 18 stops or more (which is sufficient for capturing in detail most scenes). E.g., cameras may project two imaging paths to sensors with seriously differing sensitivity, or have pixels of different sensitivity. So one part of the camera captures the darker part of the scene and the other the brighter part, and these subimages can then be combined. In principle (ignoring other factors of the imaging system such as the lens), on could have e.g. one sensor measuring 0.01 nit to 100 nit range, and the second having a 1000 times higher sensitivity (to have at least some overlap in the two ranges), i.e. capturing between 10 nit and 100000 nit. And such a camera would do pretty good for all scenes out there. The question is then whether one should still apply the same capturing process (e.g. scene design, camera calibration, etc.), or at least the same encoding process. Trying to put the entire 18 stops sensor output (260000:1 linear) in an 8 bit signal oftentimes leads to suboptimal results (cartoonization etc.). One could envisage moving back to the old situation by restricting the used camera range again to Sel(L_sc)_LDR (e.g. by ignoring the outlying values, e.g. by using a tone mapping TM_Cam with hard clipping for those outliers), but that seems silly: what is the use of a better camera then? One may try to look for intermediate solutions, but in view of the fundamental calculations presented above, 8 bit doesn't seem to be such a good way to faithfully encode anything occurring in nature. Hence there is a need for novel HDR encodings.

The present invention embodiments offer a solution to this by still allowing the specification of a preferred range, while also handling in an additional but separate manner the other captured luminances outside that range (at least at one side, e.g. the brighter side). Preferred range may mean several things depending on the system, e.g. it may be the way a content creator always used to work (it may be the dynamic range of a (previous) camera (especially when making a HDR remastering of existing LDR content), or a desired precision to represent the main part of a scene (as explained above taking into account requirements on codeable white, black, and the precision of intermediate greys). Or in an advantageous embodiment, it may be correspond to an LDR coding which renders as desired on a particular LDR reference monitor.

Note that this introduces the paradigmatically new possibility of working with two (or more) ranges. A first HDR range Sel(L_sc)_HDR may be optimally selected around the available scene luminances (e.g. by incorporating most of the available luminances inclusive a lot of the very bright parts, perhaps clipping asymmetrically, or by already mapping some particular object 111 luminances to a certain value x % G in the HDR range). Within that HDR range, a second (preferred)_LDR range may be selected, dominant scene luminance range Sel(L_sc)_LDR, and whereas it may be more advantageous to use the full scene luminance range for optimizing the HDR range, one may use the x % G allocation for positioning the LDR range (i.e. positioning the preferred range nicely around the object of interest, so that it and its environment are optimally harmonized, to start with at least in an LDR signal derivable from that scene).

I.e. the scene may be "freely" built/lighted in close conformity with HDR range (e.g. one may put HDR effects in the scene light brightly flashing lights well above the object reflection luminances), but also in another way around the most interesting objects (light them so the fall in a lower range of the HDR, which will be rendered less brightly on HDR displays, but right in the middle on LDR displays using the LDR range). One has now much more control of building scenes in this way, and one may come to understand that such luminance range hierarchies (possibly even with more subranges, whether nested or outside each other) are very useful for later processing, rendering and other uses too. More freedom is possible for the tone mapping or other image processing functions too, as we see below.

Figure 3:
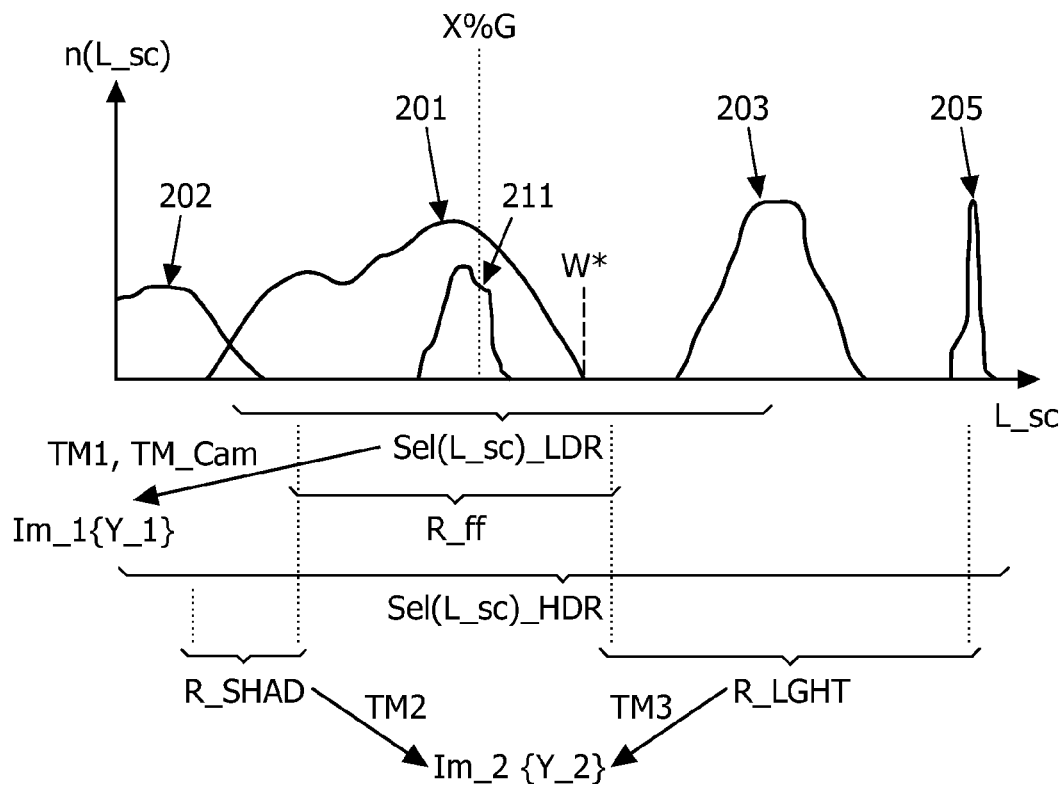
FIG. 3 schematically illustrates how embodiments of the present invention may allocate different parts of the scene to different encoded images.

In FIG. 3 we give an example of how to allocate the HDR captured scene—Sel(L_sc)_HDR is what the image sensor will output linearly—to two images corresponding to a selection of luminance subranges. A simple embodiment could just put Sel(L_sc)_LDR via a standard mapping in one image and all or some of the uncoded (i.e. outside Sel(L_sc)_LDR) luminances in a second image, both via selected tone mapping. We will however describe a somewhat more complicated scenario, from which the skilled person will understand a number of similar possibilities. It is useful if embodiments according to the present invention ideas not just encode information in the second image which is maximally complementary to the first (typically LDR, e.g. for direct presentation on an LDR display) image, but also mostly (or most precisely) that information which is the most relevant in the HDR image (e.g. the light lobe 205 colors may still be sacrificed leaving more room to better encode the bright lobe 203). Once one has abandoned the direct monotone nature of luminance encodings, there is considerable freedom as to how exactly to allocate that additional HDR information to luma codes Y_2 of a second image Im_2, taking into account also that the HDR information is of course important, but normally of lesser importance than the main region 101 faithfully encoded in a first image Im_1.

Typically values within a selected LDR range Sel(L_sc)_LDR (which may be smartly selected based on such principles as faithful rendering of the LDR image on an LDR display, or compression targets, e.g., taking into account that if it is e.g. selected narrower than more information may be written into Im_2 and vice versa) will be mapped as conventional (e.g. for MPEG—or similar standard based storage or transmission) to a conventional LDR image Im_1. In particular this is preferably done in such a way that the resultant LDR image can be used to realistically/optimally render on LDR displays (or sub-LDR displays with lower dynamic range). However, one may in principle select this LDR range according to at least some embodiments of the present invention relatively freely (as long as it approximately overlaps the region of greatest interest, needing the best representation and rendering), i.e. one could relax that optimal LDR encoding criterion somewhat, e.g. one may make the LDR range somewhat narrower to encode with higher precision than in normal LDR television practice. Most typically, since the information in Im_1 is the more important one, one will first design the mapping TM1 of scene luminances in a selected subrange (typically LDR) to the luminance codes of the first image Y_1 (in general the color codes but we simplify the explanation by focusing on luminance), and therefrom decide the HDR coding strategy for the remaining scene information, but of course one may also modify TM1 depending on HDR information, e.g. in a recursive way, by transcoding, etc. The skilled person should understand that this principle may be applied anywhere in an imaging chain, i.e. not just from RAW camera captures, but also e.g. within a redistribution apparatus (e.g. starting from a 18 bit HDR linearly encoded signal), a scheme for transmitting parallel versions of the video, e.g. some for PIP in a website, etc. Advantageously the first tone mapping TM1 and range Sel(L_sc)_LDR may be chosen so that the captured scene will render optimally on an LDR reference display (may be used without further tone mapping to restore the scene look), but alternatively the grader or device may also define the Im_1 coding so that the LDR rendering looks still good enough, e.g. after squeezing more luminances in Im_1 with a gamma function or other squeezing function (possibly co-encoding some correction tone mapping function to be applied to Im_1, so that encoding and rendering of Im_1 are decoupled).

For encoding the second image Im_2 (about which we will for simplicity of teaching assume that it is similar to the image for the LDR encoding, i.e. also typically 8 bit, a same e.g. AVC encoding, etc.; however, this could also be a 4 bit image if less additional data is required, encoded in a different format, or a higher than 8 bit precision image, it may be of reduced spatial resolution to encode the HDR data with reduced resolution, or for subregions of Im_1, only for a reduced number of time instants, etc.), we need not necessarily encode yet uncoded luminances solely, as in general it will contain a selection of some other luminances. As long as it does not just contain (nearly) all (or most) scene luminances already (faithfully) encoded in Im_1 (i.e. one makes the encodings of Im_1 and Im_2 dissimilar to a desired extent). One may interpret this Im_2 as a second pseudo-LDR image of remaining information, which cannot be shown faithfully on its own, but can be used to generate HDR or intermediate renderings, and can be encoded and further treated as if it was a normal LDR image.

In this preferred example for elucidation of some invention concepts, we consider there is a subrange of Sel(L_sc)_ LDR of faithful encoding R_ff. As mentioned above, this is typically the part of the camera sigmoid with high density luminance direction sampling, hence this region is normally sufficiently encoded in (some part of) the LDR Im_1, and not so much is gained by encoding it for a second time (although for very specific cases one could elect to encode some (usually small both in luminance and spatial range) part of the already encoded LDR range in a somewhat different way, e.g. with a different tone mapping). The latter may be useful e.g. as a guidance for receiver side image processing apparatuses for generating intermediate range (IDR) signals for IDR rendering. However, the outer regions of Sel(L_sc)_ LDR are usually strongly compressed in the LDR variant—the retained part of lobe 203 may have been encoded with say only the 4 highest codes of [0,255]—so it may make sense to encode them again in a better way. Also, the may confusingly be encoded with the same code values as regions from light lobe 205. Without better coded information, one may not derive faithful renderings for those regions/objects in the imaged scene.

In many scenarios, coding only a high luminance region 103 may be sufficient for realistic HDR encoding, and the present method may then be tuned to that situation techni-cally cheaply. In the present example we consider that there is a rationale for encoding both the darker luminances (because e.g. an HDR can better render them, or some re-tone mapping to brighten them should be enabled) and the lighter ones. Thereto luminances in a shadow range R_SHAD are selected (and as illustrated they potentially can indeed re-encode some of the LDR encoded object pixels, even if in the faithful range (range R_SHAD overlapping with R_ff). On the other hand the very darkest luminances captured by the sensor are discarded/clipped), even in the HDR encoding (i.e. mapped to 0 in Im_2). Luminances in a light range R_LGHT are also selected (which goes into the lobe 205 to ensure there still remains some image structure of the lamps interior in the encoding; again the range selection is symbolically: instead of allocating e.g. the lowest 4 lamp scene luminances to 4 separate codes and all higher lamp scene luminances to e.g. 255, one will of course allocate those 4 available highest codes spread over lobe 205 to encode all structures of different scene luminance inside the lamp, but hence representing lobe 205 with coarse precision). All this data is collected in a second image Im_2.

One understands that with the (highly non-linear, abolishing the old simple direct, continuous ("linear") encoding paradigm) freedom to design tone mappers TM2 and TM3 to map the respective scene luminances to digital image codes (Y_2), one can code the HDR scene in a very versatile way as according to desires of an application (e.g. for bit saving, for easy meta-description of the scene for further processing, etc.), yet in such a simple technical manner that in practice only tone mapping is needed. These mapping functions may be predetermined (e.g. one may have a single or a couple of selectable fixed high exponent power functions for the light ranges), or co-encoded and transmitted e.g. per shot of images as a function encoded by itself (e.g. a Lookuptable LUT) or index to a set of functions. Or the mapping functions may even be determined on the fly by mathematical algorithms calculating an optimal tone mapping based on such considerations as e.g. some of the input HDR image (e.g. of a previous time instant, or any rough characterization of the HDR content, such as a coarse histogram-based representation of the current scene or shot), and/or the used LDR encoding, possibly further also taking into account determined psychovisual models, viewing environment characterizations, HDR effect models, etc. One may e.g. think of algorithms that detect lighting in the scene, whether the bright regions of the lamps themselves, or light patterns casted.

E.g., codes [0, 80] in the second 8-bit image Im_2, or in general [0, Mx_S], may be allocated for mapping of R_SHAD by TM2, and remaining codes [Mx_S+rx, Mx_L] (e.g. [81, 255]) may then be used for the range R_LGHT.

Figure 4:
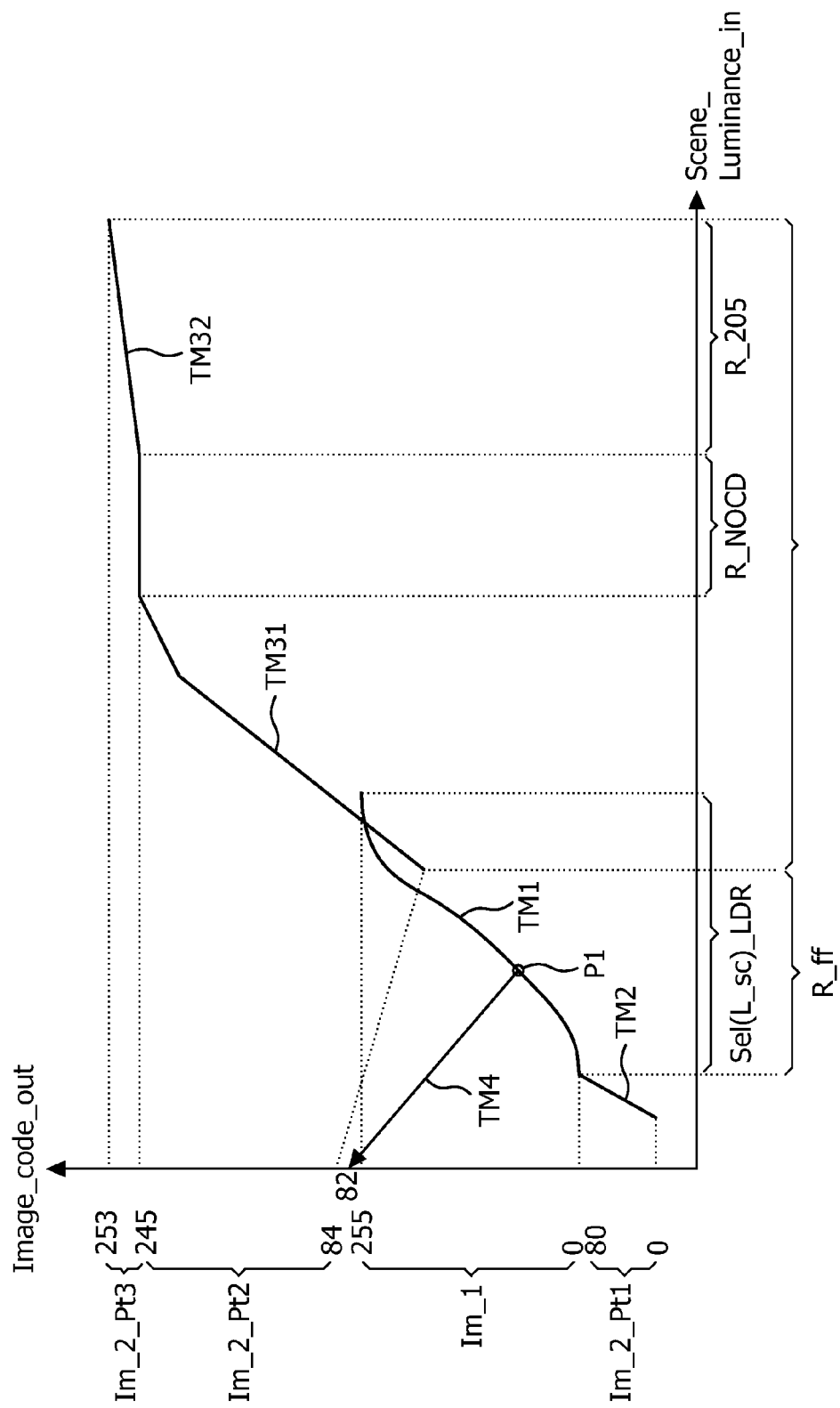
FIG. 4 schematically illustrates tone mapping between scene luminances and codes of the different encoded images.

This is shown schematically by a transformation of the scene luminances to codes (i.e. showing also the tone mappings) in FIG. 4.

If one looks at this curve there are a couple of things which are surprising compared to classical image coding, explained to understand several rationales behind the presented embodiments. Firstly, although the scene luminance x-axis runs linearly as normal between whatever values are required (e.g. whatever a camera with a couple of sensitivity settings can capture, or whatever a computer graphics generation program defines as the boundaries of resulting luminances). However, the y-axis giving the corresponding code values Y in the image, starts from 0, then runs to 80, then restarts at zero, runs to 255, restarts at 81 again, etc. This is because we map to (different luminance regions of) two (or more) different images discontinuously (although there may be some overlap reintroducing some continuity).

The tone mapping functions are represented with dashed curves, some of which for simplicity we have taken as lines (but of course they can be curved to be more optimal samplers, e.g. in correspondence with histogram properties of the currently encoded part of a video, e.g. the current scene, e.g. according to lobe boundaries of frequently occurring or highly important or special colors, such as e.g. face colors identified in bright regions). The projection as to where this curves maps to the different coded images (offset in the more simple mappings) are further clarified with the dashed lines. To generate the first image Im_1 a compressive sigmoidal mapping TM1 is used in this example, which is common so will not be elaborated further. Of course, to optimally work with the present embodiments, the shape of this sigmoidal (e.g. its middle part slope and boundaries) may be smartly chosen. Then, dark scene luminances below what is encoded in Im_1 by TM1 are mapped by TM2 to a first part (of code luminances Y_2) of the second image Im_2 Pt1. We have assumed in this example that we just need some information of darker colors, without overlap with Im_1 codes, e.g. for an application which can then derive some new values from those Y_2 pixel values (e.g. to make a dark structure more visible), whereas otherwise such an application would be faced with a blind clip losing all scene information. Brighter scene luminances are mapped to higher code values of Im_2 (e.g its second part Im_2 Pt2, which would typically contain well-encoded scene luminances from bright lobe 203, e.g. the scene behind the window in FIG. 1). We also see that there is a second continuity, namely what we conceptually presented as a single tone mapping TM3 in FIG. 3, may again decompose in more optimal further sub-tone mappings TM31 (note that it overlaps at the high end of TM1, i.e. double coding in both Im_1 and Im_2 occurs) and TM32 (which will in this example code light range R_205 of light lobe 205, and very coarsely). So there is a scene luminance region R_NCOD which "cannot" be encoded, because it need not be encoded. Because e.g. at the sender/creation side an algorithm finds that in the current images, or set of images (e.g. shot), there is nothing useful to be coded there, hence one need not was any codes with whatever coarse strategy (actually, one could of course vice versa design the mapping so that there are a couple of points there towards which scene luminances can be mapped anyway). However, there is still interesting information in much higher scene luminances, which is mapped with TM32.

Lastly, one may also allocate one or more single points to various codes (TM4). We have left a couple of codes in Im_2 unused (e.g. for further use such as synchronization purposes), because TM31 starts mapping at value 84. This exemplary coding maps a single point to 82 in Im_2. One reason why this may be useful is the following. Although there may be many scene regions/objects which need not be coded in Im_2, we still need to do something. In particular, it will be easy for a decoding algorithm to quickly find that these pixels have to be retrieved (directly or by further mapping) from Im_1. So we could give them a value 0 e.g., but then they may be confused with really dark colors. In the present example, all colors from within R_ff are treated as if the where the single point P1, and hence mapped to value 82 in Im_2 (and of course faithfully encoded in Im_1). So one sees the most relevant objects in Im_2 as single grey blobs, which is a very efficient decorrelated way of encoding indeed. Of course the skilled person may understand that there may be applications which find it more desirable if a couple of scene luminance subregions are encoded in Im_2 with different values (e.g. 10 codes: 82, 83, 84, etc.), so that one has at least a rough representation of the most important regions in Im_2. This may be useful for both applications with manual intervening (e.g. an operator which needs to quickly check which image he is dealing with can identify it better if it is not composed mostly of grey blobs), and automatic image analysis (e.g. one may do a structure mapping, such as for motion estimation, on the corresponding regions in both Im_1 and Im_2, or do processing on (coarse) histogram representations of regions of both images, etc.

One could even reverse the luminance position in Im_2 of the two ranges R_SHAD and R_LGHT (i.e. the light scene luminances are given lower code values than the dark ones), or some luminance ranges of Im_2 may be reserved for further encodings e.g. the 254 and 255 codes could be used to index what type of tone mapping TM3 is used (gamma, parabola, linear 1, . . . in which case one may put these values in Im_2 instead of the values 82, at least for some pixels, e.g. within such a grey blob), etc. In principle one could even use an interleaved encoding for different subranges in Im_2, like a Fibonacci set may determine codes within [0, 255] which via some algorithm may be equated with scene luminances L_sc of L_SHAD or representations thereof.

It is even possible to change the determinations of the mappings of the encoding of Im_2 for different spatial regions of the image, e.g. one may define a threshold on Im_1, and pixels which are dark may use a coding of Im_2 in which mostly dark luminances are encoded, whereas for the brighter parts of Im_1, the definition of Im_2 changes so that e.g. only bright luminances are encoded (i.e. a value of 0 in Im_2 would now mean e.g. 700 nit, whereas in the darker parts it would mean 0.01 nit).

When a receiver now obtains both images Im_1 and Im_2, he not only has "optimized" useful information in both of them, but this information has also been preclassified for easy further use (firstmost important ("LDR"), HDR quality improvement nr. 1, HDR quality improvement nr. 2 . . . ).

Note that the versatility of our presented methods allows working with several scenarios for (optimally) encoding the LDR part in the first picture. E.g., one may use retinex-like algorithms as according to Land, which need not necessarily encode absolute luminances or some function thereof, but may encode relative values, typically with a regional algorithm. The idea is that the eye is more interested in luminance differences than absolute luminances. So one may e.g. increase the luminance of two adjacent dark patches towards middle grey (so that their values become more similar to e.g. white patches), and then typically increase their difference (semilocal contrast). Where this may be a better representation of image structure as human beings see it, and hence potentially lead to more efficient coding, this introduces a problem with the technical rendering use of the code. Because it reduces the information of the absolute luminances (exaggeratedly one may imagine that one gives the two adjacent dark patches almost the same luminance as the 2 white patches, which may indeed happen in psychovisual experiments like illusions, but then all information on dark versus white is gone), it becomes much more difficult to handle in e.g. a tone mapping algorithm for deriving optimal rendering. In such LDR encodings, one may then re-encode e.g. some dark or white patches again in the HDR second image, to clearly convey what exact original luminance they had (i.e. absolute and relative coding together). E.g. one may encode a bright patch in the second image between a code corresponding to a starting luminance of 500 nit and a code corresponding to 12000 nit. The tone mapper may then use both of these information units to come to a final optimal rendering.

Another example of how the first image (and hence the second in coordination) may encode both absolute or relative is the following. Consider e.g. an explosion in a corridor. Then all the walls light up together with the explosion. From encoding efficiency point of view solely, it may make sense to encode the LDR image moving together with the varying brightness, e.g. take certain percentages of an average luminance value. This signal would be more difficult to use in a legacy LDR system, since one would not really see the changes in brightness, since always nearly the same signal is encoded (certain reflective percentages modulating the discounted illumination). I.e., preferred systems may select to mostly encode darker or brighter codes in the LDR image, which corresponds to fixing it in an optimal position along the original luminance range for this scene. The second image may then comprise various explosion/lighting images.

The present method also handles the fundamental question of HDR of "what is white", and consequently "what is 18% gray" and "what is 36% gray (face color)". This is important because of the dual question: how should such a "special white" be rendered (in fact, all captured colours only have a meaning when finally rendered). In conventional color spaces and LDR image generation, the gamut starts at the scene white (which is supposedly the simply lighted lightest part of the scene). From thereon, colors are constructed by removing ever more of the light, in particular by absorption by objects. In additive RGB spaces this is modeled inversely, but one may interpret them as incrementally removing elementary parts of e.g. an R-spectral band of the white spectrum. However, in a general HDR scene, there may be several whites. There may be a white in the darker part of the picture, a white in the brighter outside part, and even brighter objects. More importantly, it is questionable whether one should (in a tightly prescribed manner) expose for skin color of a person standing in the darker image region e.g., in particular since the enormous latitude of HDR imaging allows for more post-correction of the captured colors. In other words, HDR allows deliberate dark illumination of faces, e.g. for an artistic, scary effect. One may now select the HDR range for the maximum brightness of the scene luminance range, e.g. a lamp (although that need not be a real white, e.g. one may still allow some clipping of the brighter luminances, for technical or artistic reasons). And one may select one or more LDR ranges for interesting sub-environments of the HDR scene. Note that although in general our method may co-encode various LDR views on a scene and partially complementary (dissimilar) HDR remnant images, in general two images should suffice, in view of the above explained principle that already the LDR images contains a good representation of the most important composition of the scene, and (if one smartly groups/codes together the other histogram lobes) the HDR complement second image Im_2 is usually sufficient for an impressive range of HDR information. One may even further approximate the HDR information, e.g. one may consider to encode the outside the window high luminance region 103 with a reduced amount of levels (e.g. 20), which is still much better than blowing it all out. Especially some applications like e.g. internet video may only encode some of the HDR objects or effects only (maybe even as a crude addition to Im_1). I.e., the presented methods allow to optimally encode all what is desirable in the image, in particular the different HDR sub-environments, and the way they relate to the basic LDR part, in particular by choosing the right tone mappings for defining the sub-range-structure of Im_2 (i.e. e.g. the importance of rendering the window 103 in a particular way depends on what is exactly in the LDR part, and similarly one may construct the total HDR encoding hierarchy so as to offer some of the bits representing the shadow region in favor of better encoding of bright lobe 203), and moreover, this encoding also easily allows for the further use of the different HDR scene components, such as e.g. mapping to a particular display environment. Typically the encoding will be so good (have enough precisely encoded luminance information of the original scene) that it can be used in several application scenarios, although it may also be (at least to some degree) biased towards some applications, e.g. viewing in brighter environments, in which case some of the shadow regions may be less well encoded.

In addition to encoding the LDR range of interest and the HDR complement image, in general one may desire to complement those with metadata MET, e.g. indicating how ideally a range should be rendered, i.e. what look it should be given (see below). E.g. the LDR range (in fact the whole HDR scene) may be taken in overcast rainy weather. Auto-exposure algorithms have a tendency to create a flat, similar exposure of all scenes, and reduce the lighting character of the image. Even additional to this is the question how a display will render that signal in its environment. Normally it would render the inside dark environment just as bright as an outside sunny world, however HDR rendering may desire to render at least some difference in the average display output luminance for both scenes. Also, it would typically render an evening scene of an inside with a brighter outside interior relatively similar to that scene in sunlight (unless the encoding is carefully selected to simulate the scene in the codes, but then it still not known at the coding side what the renderer will do with these codes, e.g. given an increase brightness user command).

If one specifies e.g. what scene luminance, or lighting type, that LDR picture belongs to (which is an example of describing more precisely its white and/or 18% gray), the display can take this into account when rendering, to put the LDR part in such a range of the displayable luminances that it really simulates a rainy day. So this simplest example of metadata describes how now a real white can be conveyed (e.g. the white of the walls of the interior room). The rendering side can then, if it knows from the encoded white luminance metadata that an evening scene was captured, force the interior colors to colors which look darker grey at the rendering side, instead of whitish. If nothing further were to be encoded, the receiving end would already know where in the reconstructable HDR driving signal range the most relevant scene white is, namely that will be the 255 point of Im_1, and even the simplest reconstruction algorithm which just puts Im_2 directly on top of Im_1 can hence determine the linear light rendering position of that white from the used tone mappings TM1, TM2, . . . to encode the images. However, if one also adds optional metadata stating that this white was actually say 500 nit in the captured scene, an even improved rendering can occur (e.g. the display driving signal generating apparatus may remap the signal to more faithfully approximate the original scene taking display side considerations into account).

Another useful metadata is metadata regarding faces. One may in the present embodiments, and as a useful property of HDR encoding in general, illuminate faces (at least of secondary characters) in a far less precise way as was done in LDR capturing. I.e. instead of lighting them with enough light, and not too contrasty, one may illuminate some faces so that they e.g. end up somewhere in the very dark regions of the HDR range, or even all over the range in case of highly contrasted illumination such as occurring when illuminating part of the face with a strong flash light. According to the present embodiments one might encode those faces in their own subranges, especially if they are part of the HDR additional information in Im_2. However, it is already very useful if an upper and lower value of the grey values of at least one face is encoded as metadata MET. Then the rendering side may use this information when rendering the face to make it look more attractive, better hidden, etc. The x % G level in the object lobe 211, in this case face lobe, is another useful example of additional metadata. In general any luminance level of particular significance, like boundaries of ranges, may be encoded as metadata MET, but of course also further information, e.g. what ranges signify, how to process them (e.g. when brightness offsetting or contrast stretching, in particular in coordination with other regions in the scene), etc.

Figure 5:
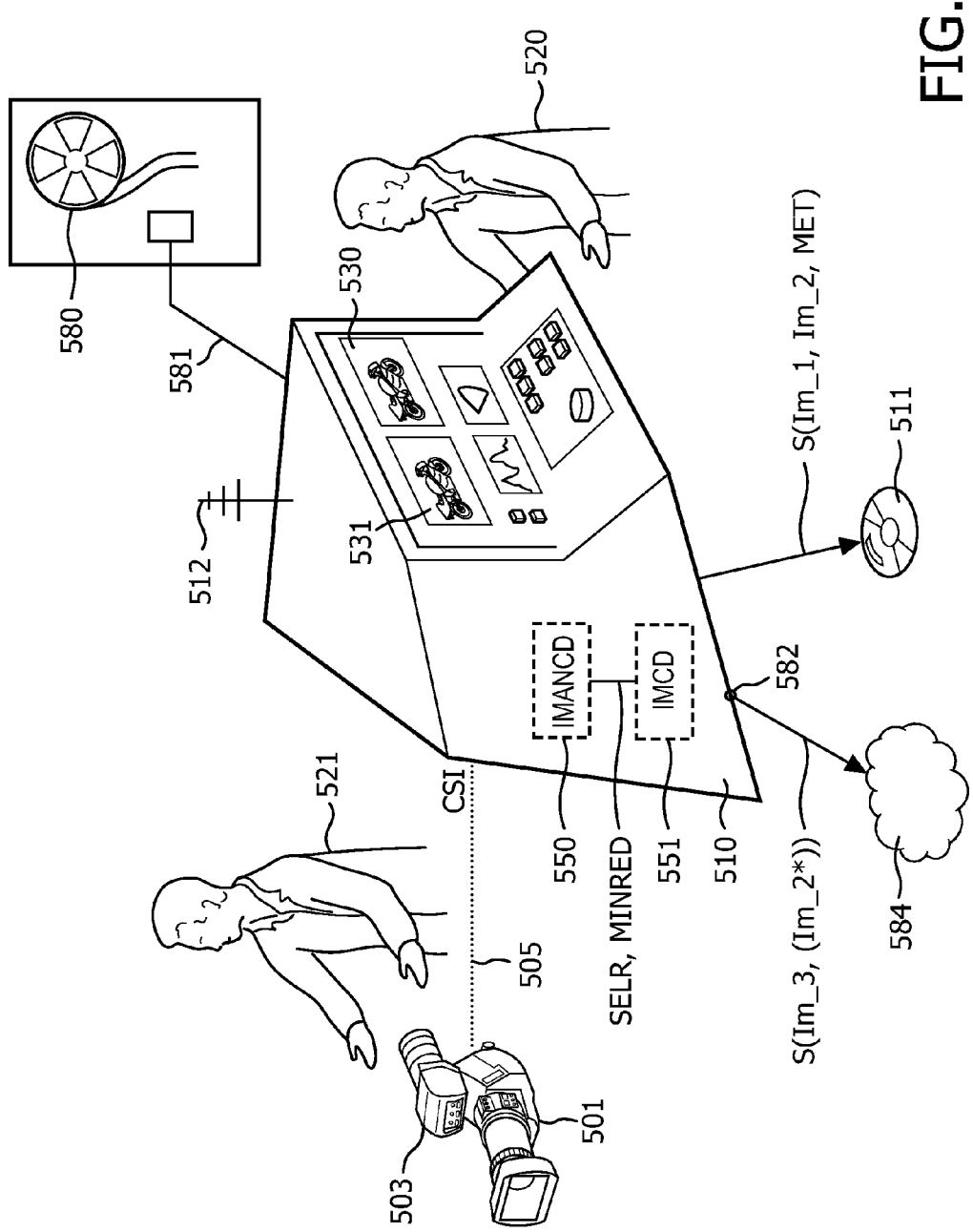
FIG. 5 schematically illustrates an encoding side system, which may be operated by e.g. a color grader.

FIG. 5 shows an exemplary system embodying some of the present inventive concepts in a movie creation system. The HDR scene is captured with a large dynamic range camera 501 capable of capturing the HDR range Sel(L_sc)_HDR, and the captured image may be watched on a camera display 503 (preferably also HDR, although it could emulate HDR, e.g. by using a sliding scale). From thereon, the image is sent over signal connection 505 (network, or wireless (satellite), etc.) to an image processing device 510. Depending on the use scenario, for real life broadcast this may be an apparatus in a director's booth or truck, but for movies it may be (offline, at a later moment) a grading apparatus of a grader 520. In the former case automatic image analysis may be done, however in the present example we assume that a semi-automatic processing is done, with guidance of the grader 520. Note that the same principles may be applied in any intermediate or further step (e.g. remastering a previously graded signal for new applications). E.g. at the capturing side a DOP 521 may already (pre)specify the LDR/HDR composition of the scene in resultant images Im_1 and Im_2, however, the grader 520 may re-specify that. E.g., he may via the appropriate tone mapping to an intermediate 32 bit representation, shift (or copy) some luminance levels of the encoded data of say highlights from the LDR Im_1 to the HDR Im_2, or vice versa, thereby obtaining a modified LDR and/or HDR encoded image. He may typically be looking at several gradings and/or encodings of the same scene, e.g. by toggling or looking side by side at a HDR version on a HDR reference display 531, and an LDR version on an LDR reference display 530. Therewith he can optimize what each of typical classes of final viewers will get to see, and balance the quality of each of these signals with e.g. bit budget. He can store the final graded images Im_1 and Im_2 on a data carrier 511. Possibly he can also store further metadata describing the meaning of the Y codes (e.g. relating at least some of them together or to original scene luminances, e.g. the actual scene luminance W* corresponding to the white code 255 of Im_1, LUTs or formulae of the different used tone mappings to encode the images Im_1 and Im_2, etc.), or possible further functions like tone mappings which can be applied to the encoded data (e.g. how to merge or remap the data in Im_1 and Im_2 for several intermediate displays between the reference LDR and HDR display), etc.

Inside the image processing device 510 are imaging processing subunits which will do the actual per pixel calculation work and produce the final output and guide and help the grader. Of course there will be an image encoding unit 551 which is arranged to derive the coded images Im_1, Im_2 on the basis of the camera input signal CSI and the grader preferences (typically handled via a UI module). In general, it will encode Im_1 given a selected lower dynamic range SELR of most interest in the HDR range (obtained from the automatic analysis and/or human operator). Typically the image encoding unit 551 will also receive a predetermined maximal redundancy MAXRED, which is a specification structure describing how much of the information already encoded in Im_1 may be redundantly encoded in Im_2. It may be so simple as specifying that only values below or above the upper and lower limits of the scene luminances encoded in Im_1 may be encoded, or below or above the range of faithful encoding R_ff. Or a more complex strategy may be specified in the structure, e.g. specifying that some values inside R_ff, or some other values are also encoded (in some of the Y_2 values). MAXRED may be obtained from a human operator, or determined by automatic image analysis algorithms, e.g. analyzing the statistical, and possibly also geometrical structure of the images to be encoded. E.g. if only few bright HDR regions have to be encoded, that incorporated algorithm may decide to use to available codes in Im_2 to redundantly encode a larger part of the range already encoded in Im_1.

Further there will typically be an image analysis unit 550 which analyzes the image aiding in the coding. E.g., it may propose a first tone mapping TM1 taking into account the statistics of CSI. It may also derive therefrom UI metadata, e.g. to show in pseudocolors in at least one of the LDR and HDR reference renderings which pixels correspond thereto, aiding the modifications by the grader. In case the image processing device 510 already receives an LDR grading together with the RAW CSI, the image analysis unit 550 may analyze the mapping TM1 to derive luminances with are encoded less precisely, or compare the grading and the RAW in many other ways to come to optimal suggestions for the grader to encode in Im_1 and Im_2, or even do so automatically without human interference.

The image processing device 510 (and grader) of this example also has an access link 581 to legacy content 580 (of course the skilled person understands that this functionality may be embodied in a different apparatus, and performed in a different stage of the imaging chain, by a different grader or computer graphics artist). With the present embodiments, the grader may add HDR effects to an old LDR movie, and the present embodiments are very useful in that the LDR encoding need not be changed ("damaged"), since it can be encoded as Im_1, and all the effects may be encoded as Im_2. Also shown is another output 582 for providing another "main content" encoding Im_3 for another communication path, which may be e.g. a very low quality encoding Im_3 for the internet 584. This encoding may then be upgraded by a correction stream of pictures Im_2* as according to the present embodiments, which may e.g. be delivered upon payment of an amount of money. Im_2* may be different from Im_2 in that e.g. it encodes only the most predominant HDR effects, and possibly some improvement of the grey values within the range encoded in Im_1.

Figure 6:
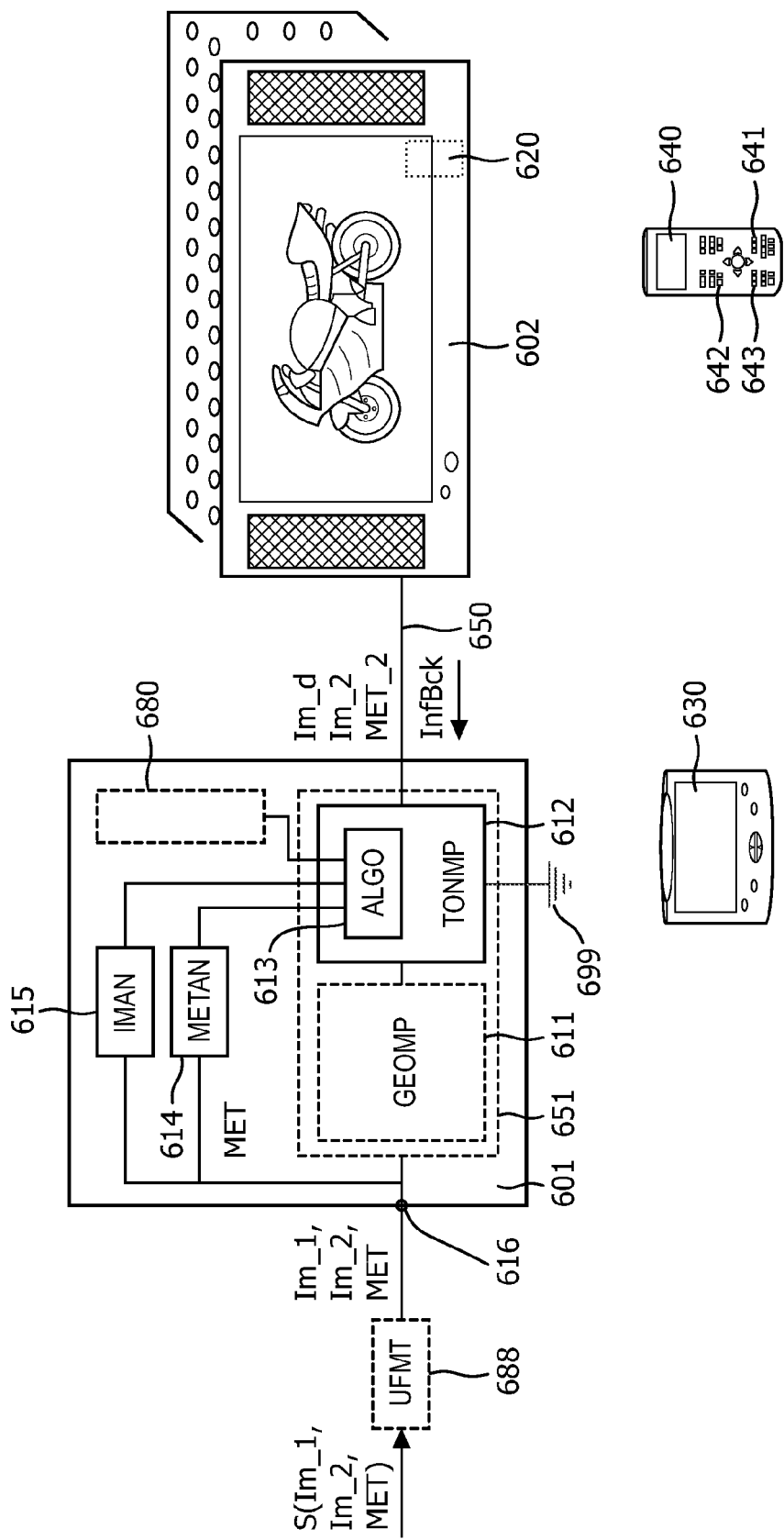
FIG. 6 schematically illustrates a decoding side system, which may be e.g. a consumer television system.

FIG. 6 shows an example of a rendering system at a receiving side. It may be composed of e.g. a video processing box 601 (which may e.g. be a settopbox or a general purpose PC computer etc.), and a display, which in this example is a LED backlighted television 602, but it may also be an OLED, etc.

The video processing box 601 has an input 616, which depending on the system may e.g. be a disk reader, a slot for a memory card and connected memory management unit, a bus to connect an external apparatus, an antenna and receiver with demodulator, etc. Symbolically we have also drawn receiver 688, which will typically be doing reformatting of the received encoded signal S(Im_1,Im_2), to obtain the two images in the appropriate format, and although we have in this example selected it to be outside the video processing box 601, it may also be part of it, e.g. be comprised with the decoding unit 651.

There may be a geometrical mapping unit 611, which e.g. may be arranged to transform Im_2 geometrically. E.g. it may create an image corresponding to a region of Im_1 where HDR additional information exists, e.g. after subsampling the Im_2 picture. More advanced algorithms may also take into account temporal subsampling, e.g. a single or a couple of Im_2 spatial regions may be present for HDR objects in the scene not faithfully encoded in the several Im_1 pictures which are encoded for the shots of that scene. Then HDR images (e.g. a driving image for directly driving a display) may be constructed e.g. by motion compensating objects encoded in a single Im_2 towards the corresponding positions of the multiple Im_1 images.

Figure 7:
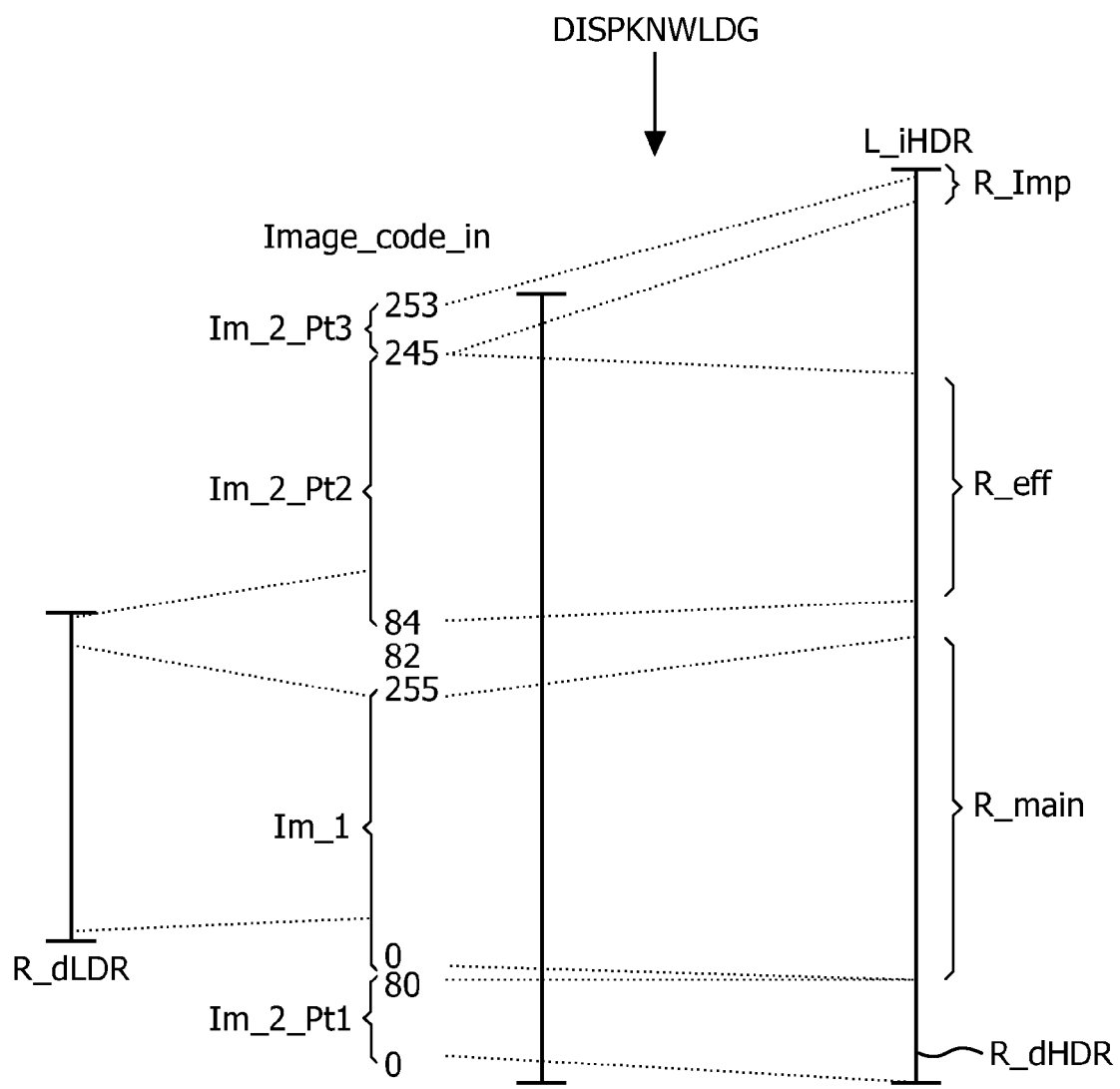
FIG. 7 schematically illustrates how a receiving side system will map the codes of the encoded signal of below embodiments to a range of a high dynamic range decoded image.

Of course there will be a luminance or in general color mapping unit 612 which is arranged to derive an HDR encoding from the Im_1+Im_2 encoding (an example of how that works is elucidated with FIG. 7). It may have a processing unit 613 for configurable algorithms, which may be determined by a metadata analyzer 614. In a simple embodiment the metadata analyzer 614 may just load a tone mapping algorithm in the processing of the processing unit 613.

A simple embodiment may encode a tone mapping so as to directly write codes above the range of Im_1 e.g.:

$Y\_final = Y\_1$ if $Y\_2 == k$, and $Y\_final = Y\_2 + 240$ otherwise.

In general the color mapping unit 612 will apply two inverse code mappings TMI1 and TMI2 which position the encoded luminances in Im_1 and Im_2 in the right position along the luminance range of the decoded HDR image (e.g. Im_d). These mappings may be partly prefixed (e.g. an index [0,10] may indicate at the beginning of the video sequence/ movie which particular mapping is to be used for TMI1, or TMI2), or they may be co-specified along with the encoded data (or even partly determined ("on-the-fly") at the receiving side). Note that in general specifying a HDR-to-LDR mapping will be largely similar to specifying its corresponding inverse LDR-to-HDR mapping, so one may co-encode either, or both in case absolute precision is required.

More advanced embodiments may use an image analysis unit 615, which may analyze the images for geometrical, statistical, large scale lighting, textural etc. properties, and therefrom propose better output HDR images, e.g. taking rendering side viewing conditions into account, psychovisual adaptation to the viewed movie, etc. The luminance/ color processing to obtain a final rendering, whether directly applied on input Im_1 and Im_2 or on intermediate image representations, may further be specified by a rendering intent configurer 680, which may be connected to a user interface, e.g. for brightness setting, etc.

Video processing box 601 generates its output HDR image, e.g. a direct display driving image Im_2 over a network link 650, e.g. HDMI. To allow the display to make its own adjustments (by image processing unit 620), some remnant of the original dual coding may be transmitted as a new dual coding, e.g. only the Im_2 (in this case subparts of that image can be used to remap inside the display, e.g. dim the HDR bright ranges upon command of a user via remote control 640). The user may e.g. define rendering preference profiles with his remote control, e.g. he may desire to dim the brighter regions because they are too harsh to him. This can be easily done with the present embodiments, since re-renderings and HDR effects can be effected by solely operating on the second image data, while protecting the rendering based on the first image data. Also new metadata MET_2 can be sent, e.g. suggestions on how to (re)render the video, e.g. upon receival of particular UI rendering commands.

The network link may also be configured to receive information INfBck back, e.g. suggestions from the display on how it wants to render, requests for further data such as encodings of the absolute scene luminances corresponding to particular codes of Im_d, parameters for deriving new Im_d* images, etc.

Note that what has exemplary been described here as in the video processing box 601, may typically also be embodied in a decoding unit. I.e. a decoding unit 651 may typically contain a format reader for reading to encoded format (unpacking etc.), and one or more data mappers for mapping to codes of the two or more images Im_1, Im_2 to a HDR (intermediate) representation. More advanced encoders may also comprise units to analyze metadata, and units to apply further mappings to the luminance codes Y_1, Y_2 or codes in the intermediate HDR range. They may also contain geometrical mapping units to geometrically match geometrically defined encodings of Im_2, such as e.g. a subimage of 100×100 pixels encoding only a local HDR object.

As an example of how the present embodiments and easy re-renderings work with a user interface can be shown with a "information aware brightness control", e.g. button 641. Instead of blindly adding offsets to e.g. the transmitted Im_d, upon pressing this button the video processing box 601 or television may apply a new strategy which remaps the information of the dark lobe 202 into the lower regions of Im_d differently, so getting a much better visibility of the dark objects.

The video processing box 601 may also compose a second driving image over a second network link 699 (in the example wireless) to e.g. a portable LDR viewing apparatus like an Ipad which another user may use to watch the movie in bed.

The present embodiments allow improved user-interface commands at the rendering side. A more intelligently adapting relighting button 642 or more intelligent contrast improvement button 643 may make use of the metadata, but also the encoded subranges. E.g. the contrast button may be applied to a facial region which is in the dark an illilluminated. It may be functioning in a "brightness increase" mode. This brightness increase may take all factors into account. E.g. it may have an algorithm examining the upper and lower limit of the face range in the metadata, and modify the facial luminances based on those. It may examine further metadata related to the face, e.g. a prescription indicating that the face should be "dark and hidden", which disallows large brightenings on that face. Or they may be indicators that the face has to stay "high contrast", etc. E.g., a modifying gamma to be applied to the face region may depend on the metadata.

As an example of using the different ranges of the images Im_1 and Im_2, the relighting button may e.g. function as an overall lightness increase (whether global or which a geometrical lighting pattern), or a color temperature change, but apply these differently to the main objects encoded in Im_1 and the parts encoded in Im_2. E.g. the main object pixels may have their grey values strongly increased, whereas the HDR ranges are only changed to keep some coordination as to the final look given the changes in the main range of lobe 201.

In any case, the separate coding of Im_1 allows the best rendering of at least that range, even on HDR displays. Especially intermediate range displays will find it easier to balance the rendering of the main range encoded in Im_1 versus the HDR parts in Im_2, and e.g. apply a reduction of the main range brightness for power saving, while still allowing some headroom for at least some HDR effects encoded in Im_2 (in fact, conversely, it may be only the data of Im_2 which is darkened for power saving). All these operations may take into account viewing environment factors such as e.g. the illumination measured around the displays etc.

The dark ranges may e.g. be (largely) discarded unless the display is being viewed in a dark environment. The present embodiments allowing separation of this information make this a simple operation. Some applications may also only transfer that information in case it is needed, e.g. an adaptive home networking environment (e.g. over wireless HDMI) may only transmit the Im_2 from a home content server with a dark range in case the display is viewed in the dark (which may be communicated back by the display), and otherwise re-determine the coding of Im_2 so that the entire available data is used for encoding brighter ranges (or reduce the amount of data by a very simple transformation to less bits by thresholding).

Figure 8:
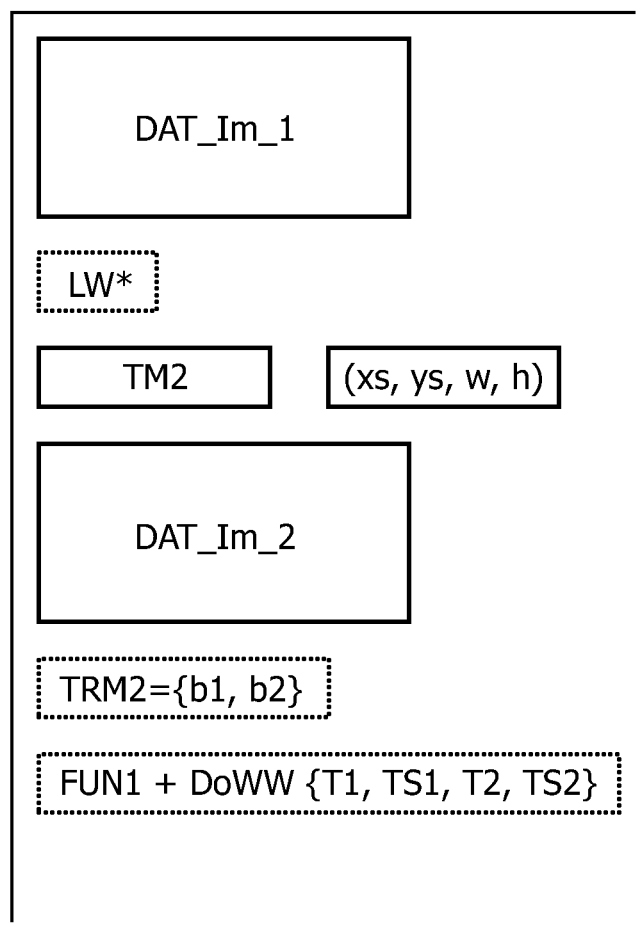
FIG. 8 schematically illustrates how a signal and its data structure may be formatted to convey the information allowing the below encoding principles.

It is also very simple for the content creator to specify looks for the HDR ranges with additional metadata. E.g. with a couple of functions and/or thresholds, he may specify that a bright regions, which is faithfully encoded, is rendered white-washed nonetheless. An example of how such rendering specifications may be co-encoded is shown in FIG. 8. The content creator may specify rendering functions, in this case a first function to do white-washing on the parts encoded in Im_2 above the range of Im_1. This rendering may be specified e.g. that all values of Y_2 below T1 are linearly mapped to be below TS1 of reduced luminance, and all values below T2 are mapped below TS2, and TS2 may be one value above TS1, so that those values are actually clipped. This also elucidates how the rendering side may apply totally different rendering/modification strategies to the main region and other regions of the scene.

FIG. 7 symbolically shows how an image processing apparatus at the rendering side can derive a driving signal for final rendering on two displays, with output luminance ranges R_dLDR and R_dHDR. The skilled person should know about the driving physics, electronics, display calibration, preferred rendering modes (e.g. vivid) etc, so we won't elaborate on those, but solely on how the encoding (now image_code_in) of the image or video leads to a final rendering of luminances coming out of the display. The display will generally do the mapping with display knowledge DISPKNWLDG, such as how the display white and black relate to the viewing surround. Therefore, the image processing apparatus can apply such algorithms that only some of the dark luminances encoded within Im_2 Pt1 are outputted, and preferably in a non-linear way giving e.g. more visual emphasis to the upper luminances of Im_2 Pt1, increasing the contrast, etc. The middle range encoded in Im_1, may typically be rendered somewhat brighter than on a reference LDR display if one has a very bright LDR display, yet the average brightness (or location of the mapped main range R_main, i.e. display output luminances after the mapping of everything which occurs in the display and further components of the rendering system) may also be lowered, e.g. to create an enhanced HDR effect for the currently rendered scene. In general however these main region luminances will not be rendered to brightly, and often of comparable average brightness as an LDR display would show them. Above R_main, there will be a range of the HDR parts of the scene, namely the HDR display range R_eff. Again the display may determine the luminance extent of that depending on e.g. psychovisual considerations like the HDR look taking into account the main rendered part in R_main, or considerations like energy saving. The current example shows the light lobe 205 being mapped in light range R_lmp, which may correspond to nearly the highest HDR display driving codes e.g. 1019, 1020, 1021, but not necessarily the very highest 1023.

Similarly an driving signal may be constructed for an LDR display, which essentially uses the Im_1 codes for driving, but may e.g. drop some of the darker ones because of rendering environment illumination, and introduce (map) some of the brighter colors from the second image Im_2 encodings. If an LDR display or display system is so primitive it can only receive the Im_1, of course it will use the Im_1 data solely, but an imaging system having available the Im_2 data can of course create a new LDR driving signal for the LDR display taking into account at least some of the information of Im_2, e.g. the lower luminances of the brighter regions encoded therein. L_iHDR are the luminances obtained in the HDR range, which may be intermediate (to be further transformed e.g. by a particular rendering side rendering intent) or final (even display driving values).

FIG. 8 symbolically shows an example of a video encoding. DAT_Im_1 and DAT_Im_2 may be data structures for e.g. the DCT blocks of Im_1 and Im_2. The tone mapping operator specification TM2 indicates how to map DAT_Im_2 and DAT_Im_1 together to recreate an HDR image (further tone mappings may be encoded to create intermediate images). It may be a LUT, or an index to a number of predefined mapping strategies (e.g. for wide range versus narrow range bright regions above the main range).

There may also be tone mappings TRM2 prescribing certain different renderings for the HDR display, e.g. boosts b1 and b2 to be applied to the bright lobe 203 part, e.g. under user interface control. Geometrical coordinates (xs,ys,w,h) may define how the rectangular image encoded with DAT_Im_2 maps geometrically onto the rectangle of Im_1. Metadata like the scene white luminance LW* corresponding to DAT_Im_1 may also be encoded, e.g. in AVC one may use supplemental enhancement information. In general several parameters related to the main region range 101 of Im_1 may be encoded, such as (LDR) black point, desired contrast, relative locations in an HDR code range, parameters of critical positions on the tone map TM1, information on facial colors or illumination, etc. Similarly interesting luminance or code points within the Im_2 ranges may be encoded, e.g. where a new kind or level of object occurs, or a new tone mapping strategy should be used, etc.

Note that there may be further (sub)images encoded, e.g. giving different specified rendering intents for intermediate dynamic range displays, etc.

Figure 9:
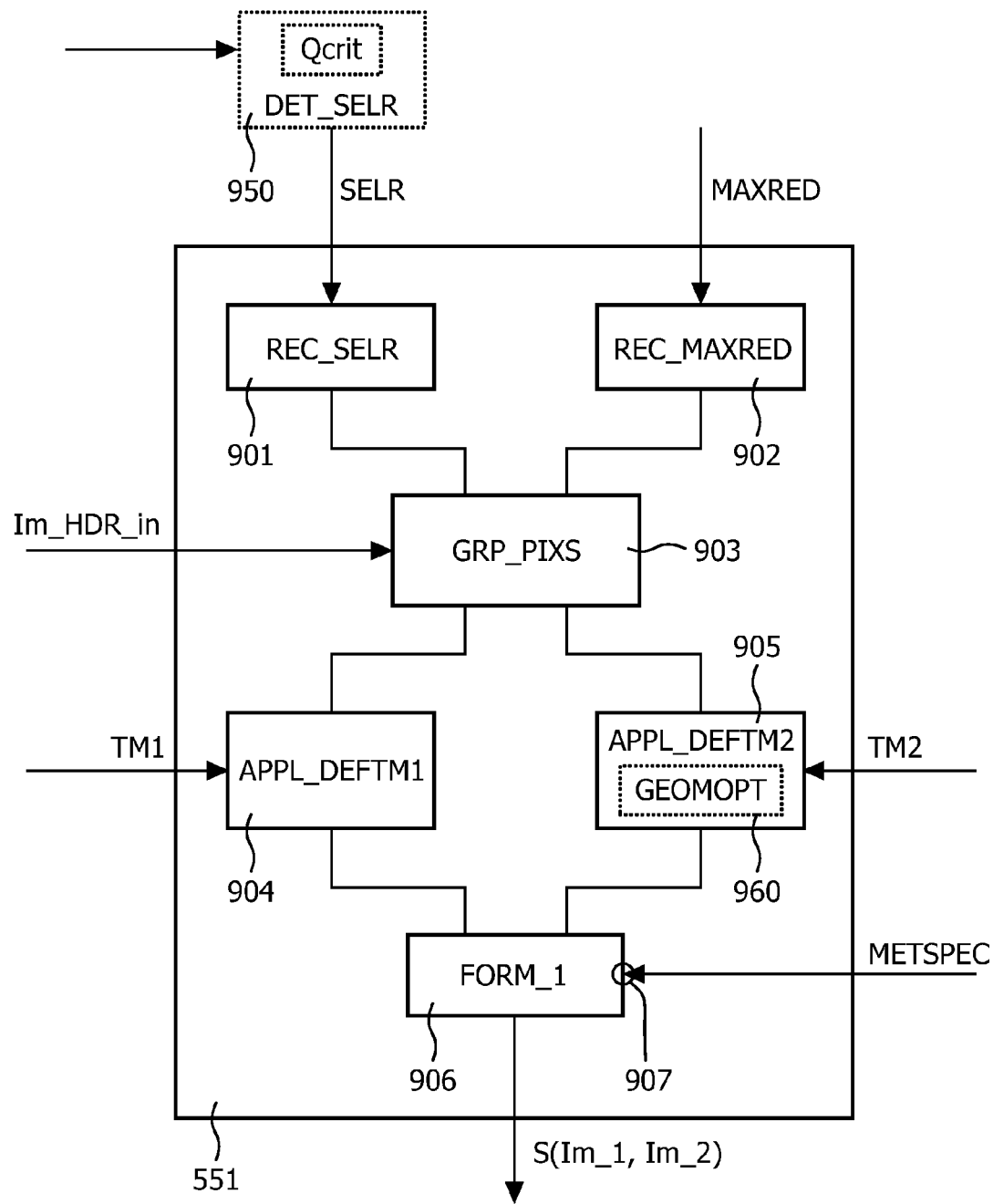
FIG. 9 schematically illustrates a more detailed interior construction of a possible encoding unit.

FIG. 9 elucidates in some further detail an exemplary image encoding unit 551. It will have a first receiver 901 for receiving a lower dynamic range SELR (which will typically be specified as a low and high value of a luminance or similar quantity, like luma), and a second receiver 902 to receiving a maximal redundancy MAXRED (determined by a human, an image analysis unit, or predetermined in advance, etc.). Of course this redundancy not only specifies which luminance values already encoded in Im_1 need to be encoded again, but also those values which were not yet encoded (outside the encoded range typically), and so have to be encoded in Im_2 (one can see this as a "no redundancy" or "code outside only"). In the simplest variants, MAXRED may be a structure comprising luminance levels, e.g., it may be embodied as a first threshold below which are dark luminances to be (re)encoded in Im_2, a second threshold above which the bright luminances to be (re)encoded lie, and one or more middle value luminance(s), which will represent all values in between the first and second threshold (in case there is only a single middle value luminance it need not be accurately specified—only the code it maps to in Im_2—but may be specified as the midpoint between the first and second threshold). There may be a small overlap with the outer regions of Sel(L_sc)_LDR, or no overlap. Alternatively one may desire to e.g. re-encode some subrange within R_ff (e.g. a face), and then MAXRED may be embodied comprising two further luminance range boundaries, for which the mapping to Im_2 continuous above the dark range, or with some further tone mapping for that range. I.e. the maximal redundancy may than function as a kind of selector whether a pixel, based on the value of its luminance along the different specified ranges, still needs to be encoded in the second image, with the second tone mapping TM2.

An image processing unit 903 will typically receive an input high dynamic range image IM_HDR-in, and group the pixels in pixels to be encoded in the first Im_1 respectively the second Im_2 image (or both), and apply the appropriate coding to them. This is achieved by first code mapping unit 904 and second code mapping unit 905, which are typically arranged to receive mapping definitions TM1 resp. TM2, which may be determined by other units which analyze the image, receive human operator commands, etc. They map the luminances or lumas of e.g. a RAW camera signal or intermediate HDR representation to lumacolor code values of the first respective second image, i.e. e.g. to [0,255].

Finally, a formatter 906 formats everything into encoded output signal S(Im_1, Im_2). Formatter 906 may also have an input 907 to receive further metadata METSPEC such as e.g. rendering instructions from the human operator, to be included in high dynamic range encoding S(Im_1, Im_2) as metadata MET.

There may be a range determination unit 950 connected, which determines which range SELR should be used, e.g. based on a (potential) quality criterion of rendering quality of the data encoded in Im_1 on a reference LDR display, whether receiving additional guidance or specification data from a human or fully automatic. In case of automatic determination, a quality criterion Qcrit may be an algorithm loaded into a memory, which e.g. looks at the LDR encoded image and determines such factors as semilocal and local contrasts of several regions, percentages of certain colors such as dark blacks, precision and range of luminances in face regions, amount of (soft)clipping, etc. A human operator may just evaluate the quality visually on his reference monitor. At least SELR, but also typically together with TM1, will influence these parameters, until a satisfactory quality level is reached (by e.g. applying more softclipping and defining a smaller region R_ff).

Embodiments of the second code mapping unit 905 may be constructed to not just apply a luminance-code mapping to every pixel yielding a similar size Im_2, but to also contain a geometric optimization unit 960, which may apply further transformations to the data, e.g. define spatio-temporal subimages Im_2 of smaller size than Im_1, to be applied only a certain places and times, and to co-encode by transmitting to the formatter descriptive data allowing correct decoding, such as a position (xs,ys,w,h) in the Im_1 frame where the data of the smaller picture Im_2 belongs, time instants along the time code of Im_1, etc. (further geometrical applications may be used such as subsampling, shape transformation, basis function decomposition, etc.; note that in general both images or part thereof may of course be encoded as raw pixel images or DCT or other transforms, etc.)

Figure 10:
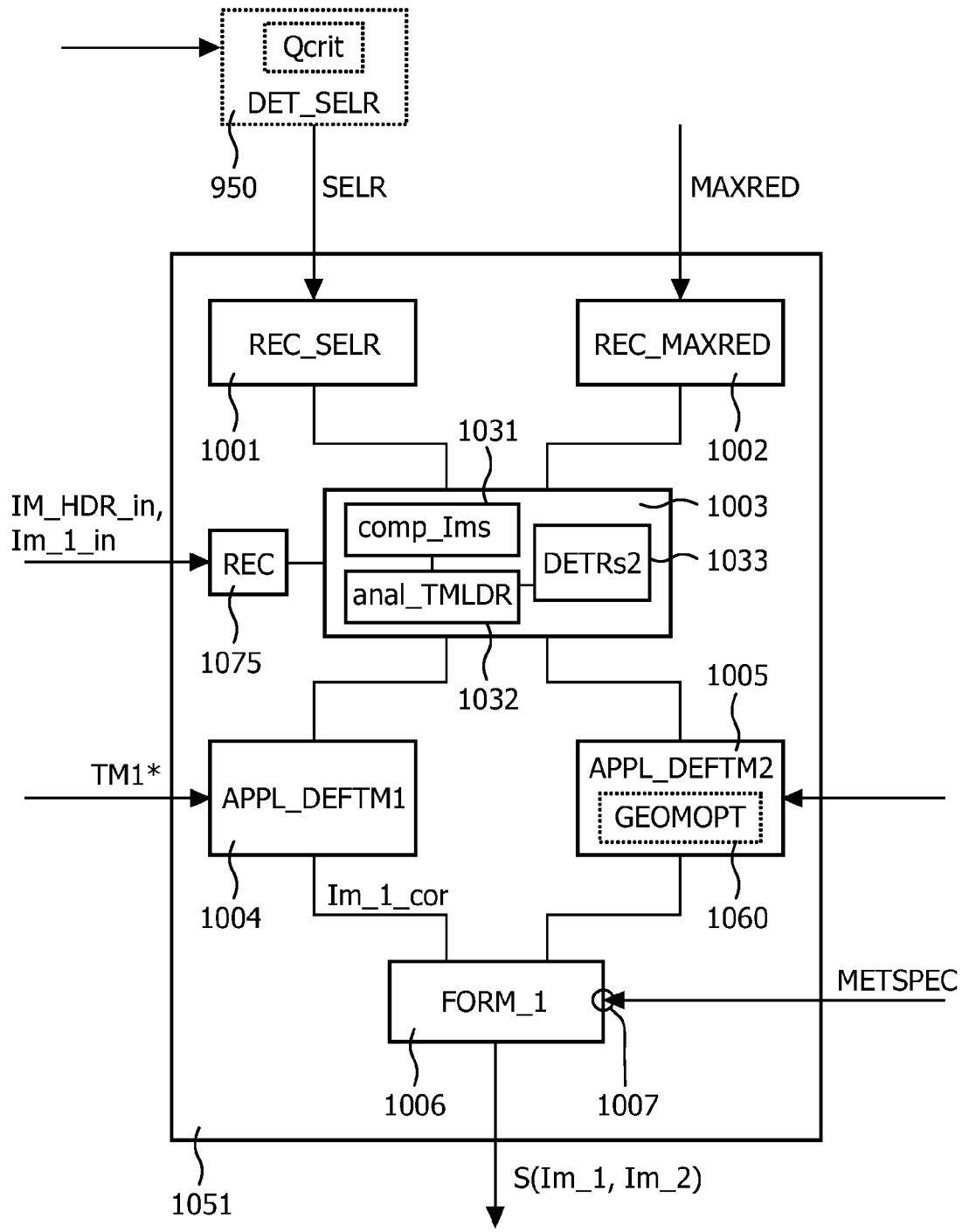
FIG. 10 schematically illustrates a more detailed interior construction of another possible encoding unit.

FIG. 10 describes an image encoding unit 1051 which is largely similar to 551 (i.e. 1005 is similar to 905, and so are 1060, 1006, and 1007, so they will not be described again, and 1001 and 1002 are optional in that they may provide only guidances for SELR and MAXRED, since this image encoding unit 1051 may determine these by itself. The difference is that now not only a high dynamic range image IM_HDR_in is inputted, but also already an existing LDR image Im_1_in (we can see this as a kind of transcoder, but it may also be a unit for upgrading an existing Im_1, since IM_HDR_in may be formed by a connected apparatus applying e.g. computer graphics effects to create, or regenerate HDR objects or image regions or ranges). A receiver 1075 receives both images and manages sending them correctly to the further subunits (typically after doing inverse CABAC, IDCT, gamma mapping, etc. so that the images are in the correct native (typically linear luminance) format for doing processing upon). Image processing unit 1003 may now be embodied to comprise a comparator 1031 to compare the Im_1_in and IM_HDR_in, and evaluate which pixels still need to be encoded in Im_2, and how (so in general image processing unit 1003 may also feedback from the analysis information to steer code mapping unit 1060, e.g. the code mapping to be applied (instead of it coming from outside). There may also be a grade analysis unit 1032, which may look at how a mapping to Im_1_in from IM_HDR_in will look, and e.g. identify regions with low slopes and few used codes, which need better recoding in Im_2. Finally a selector 1003 will select which pixels of IM_HDR_in will need further encoding into Im_2 by 1005. Note that also the first code mapping unit 1004 is now slightly different. It may not be needed if Im_1_in is just copied into the outputted Im_1, but it may also determine a corrected Im_1_cor to be outputted, e.g. a better, more contrasty looking LDR grading, whether determined by the image encoding unit 1051 itself, or by a specified mapping TM1* from outside.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may behave been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection wired or wireless-, or program code on paper. Apart from program code, characteristic data required for the program may also be embodied as a computer program product. Such data may be (partially) supplied in any way.

The invention or any data usable according to any philosophy of the present embodiments like video data, may also be embodied as signals on data carriers, which may be removable memories like optical disks, flash memories, removable harddisks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image encoding unit arranged to encode a high dynamic range image (IM_HDR-in) comprising:
    a first receiver for receiving a lower dynamic range (SELR);
    a first code mapping unit arranged to encode in a first image (Im_1) all pixels of the high dynamic range image (IM_HDR-in) with luminances within the lower dynamic range (SELR);
    a second receiver for receiving a maximal redundancy (MAXRED), which specifies to which amount luminances already encoded in the first image (Im_1) need to be redundantly encoded again, wherein the maximal redundancy is a set of luminance level specifications comprising at least one luminance level specification, specifying at least one luminance subrange of the range of luminances of the high dynamic range image (IM_HDR-in);
    an image processing unit arranged to determine, based upon the maximal redundancy (MAXRED), which pixels of the high dynamic range image (IM_HDR-in) need to be encoded in a second image (Im_2);
    a second code mapping unit arranged to encode in the second image (Im_2) luminances of the pixels of the high dynamic range image (IM_HDR-in) which need to be encoded in the second image (Im_2); and
    a formatter arranged to output the first and second image as a high dynamic range encoding S(Im_1, Im_2), and wherein the first code mapping unit and the second code mapping unit are arranged to apply respective tone mappings TM1 and TM2, which are optimized according to encoding efficiency and/or visual quality of rendering.

2. An image encoding unit as claimed in claim 1, wherein the image processing unit is arranged to compare luminances of the high dynamic range image (IM_HDR-in) with the luminance level specifications and therefrom determine which pixels of the high dynamic range image (IM_HDR_in) need to be encoded in the second image (Im_2).

3. An image encoding unit as claimed in claim 1, in which the first code mapping unit is further arranged to determine the encoding of luminances of the high dynamic range image (IM_HDR_in) in the first image (Im_1) according to a quality criterion (Qcrit) of rendering quality of the data encoded in Im_1 on a reference LDR display.

4. An image encoding unit as claimed in claim 1, in which the second code mapping unit is further comprising a geometric optimization unit arranged to apply a geometric transformation to encode the data for the second image (Im_2) in a realization of the second image (Im_2) being smaller in size and/or occurring less frequent in time than the first image (Im_1).

5. An image encoding unit as claimed in claim 1 in which the first code mapping unit is arranged to create the first image (Im_1) with a word length per pixel of 8 or 10 bit, and the second code mapping unit is arranged to create the second image (Im_2) with a word length per pixel of 4, 5, 6, 7, 8, 9, 10, 11, 12, 13, 14, 15 or 16 bit.

6. An image encoding unit as claimed in claim 1 in which the formatter is arranged to communicate the first image (Im_1) and the second image (Im_2) over separate communication channels and Im_2 on demand over an internet connection.

7. An image encoding unit arranged to encode a high dynamic range image (IM_HDR-in) comprising:

a receiver for receiving the high dynamic range image (IM_HDR-in) and a first image (Im_1_in) encoding luminances in a lower dynamic range situated within a higher dynamic range of the high dynamic range image (IM_HDR-in);

an image processing unit arranged to determine a maximal redundancy (MAXRED), which specifies to which amount luminances already encoded in the first image (Im_1_in) need to be redundantly encoded again, wherein the maximal redundancy is a set of luminance level specifications comprising at least one luminance level specification, specifying at least one luminance subrange of the range of luminances of the high dynamic range image (IM_HDR-in), and comprising a selector arranged to determine based upon the maximal redundancy (MAXRED) which pixels of the high dynamic range image (IM_HDR-in) need to be encoded in a second image (Im_2);

a second code mapping unit arranged to encode in the second image (Im_2) luminances of the pixels of the high dynamic range image (IM_HDR_in) which need to be encoded in the second image (Im_2); and a formatter arranged to output the first and second image as a high dynamic range encoding S(Im_1, Im_2), and wherein the second code mapping unit is arranged to apply a tone mapping TM2, which is optimized according to encoding efficiency and/or visual quality of rendering.

8. An image decoding unit arranged to decode a high dynamic range encoding S(Im_1, Im_2), whereby Im_2 contains data of luminances outside a range of luminances encoded in Im_1, comprising:

a receiver for obtaining a first image (Im_1) and a second image (Im_2) from the high dynamic range encoding S(Im_1, Im_2); and a color mapping unit arranged to apply a first inverse code mapping TMI1 respectively a second inverse code mapping TMI2 to the luminances encoded in the first image (Im_1) respectively the second image (Im_2), to obtain a decoded HDR output image (Im_d), whereby the second inverse code mapping TMI2 maps to luminances of the decoded HDR output image (Im_d) outside the range of luminances to which the first inverse code mapping TMI1 maps.

9. An image decoding unit as claimed in claim 8, wherein the receiver is arranged to extract information of the first inverse code mapping TMI1 or second inverse code mapping TMI2 from metadata (MET) encoded in the high dynamic range encoding S(Im_1, Im_2, MET).

10. An image decoding unit as claimed in claim 8, comprising a geometrical mapping unit arranged to apply a geometrical transformation to the data in Im_2 prior to performing the second inverse code mapping TMI2.

11. An image decoding unit as claimed in claim 8, in which the color mapping unit is further arranged to apply additional tone mappings to the luminance data encoded in the first image (Im_1) and the second image (Im_2) independently.

12. A method of image encoding for encoding a high dynamic range image (IM_HDR-in) comprising:

receiving a lower dynamic range (SELR);

encoding in a first image (Im_1) all pixels of the high dynamic range image (IM_HDR-in) with luminances within the lower dynamic range (SELR);

receiving a maximal redundancy (MAXRED), which specifies to which amount luminances already encoded in the first image (Im_1) need to be redundantly encoded again, wherein the maximal redundancy is a set of luminance level specifications comprising at least one luminance level specification, specifying at least one luminance subrange of the range of luminances of the high dynamic range image (IM_HDR-in);

determining, based upon the maximal redundancy (MAXRED), which pixels of the high dynamic range image (IM_HDR-in) need to be encoded in a second image (Im_2);

encoding in the second image (Im_2) luminances of the pixels of the high dynamic range image (IM_HDR-in) which need to be encoded in the second image (Im_2); and outputting the first and second image as a high dynamic range encoding S(Im_1, Im_2), and wherein the first code mapping unit (904) and the second code mapping unit are arranged to apply respective tone mappings TM1 and TM2, which are optimized according to encoding efficiency and/or visual quality of rendering.

13. A method of image decoding for decoding a high dynamic range encoding S(Im_1, Im_2), whereby Im_2 contains data of luminances outside a range of luminances encoded in Im_1, comprising:

obtaining a first image (Im_1) and a second image (Im_2) from the high dynamic range encoding S(Im_1, Im_2); and applying a first inverse code mapping TMI1 respectively a second inverse code mapping TMI2 to the luminances encoded in the first image (Im_1) respectively the second image (Im_2), to obtain a decoded HDR output image (Im_d), whereby the second inverse code mapping TMI2 maps to luminances of the decoded HDR output image (Im_d) outside the range of luminances to which the first inverse code mapping TMI1 maps.

14. An image encoding structure of a high dynamic range scene, the image encoding structure comprising:

data of luminances within a preferential narrower subrange (Sel(L_sc)_LDR) of a high dynamic range (Sel (L_sc)_HDR) of the high dynamic range scene being encoded in a first image (Im_1); and data of luminances outside the preferential narrower subrange (Sel(L_sc)_LDR) of the high dynamic range (Sel(L_sc)_HDR) being encoded in a second image (Im_2), wherein the preferential narrower subrange (Sel(L_sc)_LDR) is preferably selected to allow good rendering of the first image (Im_1) on a reference low dynamic range display according to a quality criterion (Qcrit) of rendering quality of the data encoded in first image (Im_1) on the reference low dynamic range display.

15. A data carrier comprising an image encoding as claimed in claim 14.

16. A computer program product comprising code means allowing a computing unit to execute the method of claim 12.

* * * * *